US005413367A

United States Patent [19]

Ochiai

[11] Patent Number: 5,413,367

[45] Date of Patent: May 9, 1995

[54] MOVABLE CHAIR

[75] Inventor: Shigeyoshi Ochiai, Tokyo, Japan

[73] Assignee: Nippon Telegraph and Telephone Corporation, Japan

[21] Appl. No.: 235,249

[22] Filed: Apr. 29, 1994

Related U.S. Application Data

[63] Continuation of Ser. No. 876,969, May 1, 1992, abandoned.

[30] Foreign Application Priority Data

| | | | |
|---|---|---|---|
| May 7, 1991 | [JP] | Japan | 3-130307 |
| May 7, 1991 | [JP] | Japan | 3-130308 |
| May 7, 1991 | [JP] | Japan | 3-130309 |
| Mar. 23, 1992 | [JP] | Japan | 4-094951 |

[51] Int. Cl.[6] ..................... B62M 1/16

[52] U.S. Cl. ..................... 280/250.1; 280/5.22; 280/244; 280/304.1; 280/DIG. 10; 180/8.5; 180/8.7; 305/18

[58] Field of Search ..................... 180/6.5, 6.54, 6.62, 180/7.1, 8.1, 8.2, 8.5, 8.6, 8.7, 9.62, 10, 907, 79.3; 305/4, 8, 16–18, 24; 280/5.2, 5.22, 5.24, 5.26, 244, 250.1, 304.1, 761, 844, 98, DIG. 10, 650

[56] References Cited

U.S. PATENT DOCUMENTS

| | | | |
|---|---|---|---|
| 654,291 | 7/1900 | Stith | 280/200 |
| 1,101,316 | 6/1914 | Moore | 305/17 |
| 4,118,046 | 10/1978 | Vaughan | 280/304.1 |
| 4,566,707 | 1/1986 | Nitzberg | 280/5.22 |
| 4,679,849 | 7/1987 | Torgny | 297/330 |
| 4,938,305 | 7/1990 | Park | 180/8.5 |
| 4,966,379 | 10/1990 | Mulholland | 280/250.1 |
| 5,020,818 | 6/1991 | Oxford | 280/253 |

FOREIGN PATENT DOCUMENTS

| | | | |
|---|---|---|---|
| 2574740 | 6/1986 | France . | |
| 3922582 | 1/1990 | Germany . | |
| 8701561 | 2/1989 | Netherlands | 280/250.1 |
| 0121664 | 5/1948 | Sweden | 305/16 |
| 0032510 | 12/1904 | Switzerland | 305/18 |
| 1607805 | 11/1990 | U.S.S.R. | 280/250.1 |

*Primary Examiner*—Margaret A. Focarino
*Assistant Examiner*—Anne Marie Boehler
*Attorney, Agent, or Firm*—Blakely, Sokoloff, Taylor & Zafman

[57] ABSTRACT

A movable chair includes a chair main body and a pair of left and right traveling devices. The chair main body has a seat portion. The traveling devices are disposed on left and right sides of the chair main body and are designed to move the chair main body while supporting the chair main body. The traveling devices includes traveling frames disposed along a traveling direction, endless rail portions respectively disposed around the traveling frames, endless tracks respectively wound around the endless rail portions, a driving section for driving the endless tacks, and a control section for allowing a sitting person to control the driving section. The endless tracks includes endless driving belts, and a plurality of ground-contact feet mounted on the endless driving belts and having different shapes.

16 Claims, 18 Drawing Sheets

MOVABLE CHAIR

This is a continuation of application Ser. No. 07/876,969, filed May 1, 1992, now abandoned.

BACKGROUND OF THE INVENTION

The present invention relates to a movable chair suitably used by a person physically handicapped by his/her legs, loins, or the like and, more particularly, to an improvement in a folding mechanism allowing a physically handicapped person to mount/dismount on/-from the movable chair by his/her own strength, traveling devices for the movable chair, a direction change device for the movable chair, and the like.

For a person who is physically handicapped by his/her legs or loins and cannot stand or walk by his/her own strength, a movable chair such as a wheelchair is indispensable to indoor and outdoor activities in daily life. For example, in the home, the person is required to move about in narrow places, such as the kitchen, the toilet room, the bathroom, and the entrance. Outside, the person must move on various types of roads and footpaths and must move in/out of elevators and the like, and is also required to move about narrow spaces in various buildings, e.g., stations, and stairs and uneven paths. At most of these places, a movable chair such as a wheelchair is used.

As a movable chair of this type, a most widely used wheelchair has two front wheels and two rear wheels and is designed to allow a person to travel while supporting the person sitting on the seat on the large-diameter rear wheels. In addition, the small-diameter front wheels are designed to be steered, for example, to allow the wheelchair to travel in a desired direction. According to such a general wheelchair, the traveling direction can be relatively easily changed by steering the front wheels in a desired direction and rotating the rear wheels in opposite directions, i.e., forward and backward directions, respectively.

In recent years, the wheelchair as the above-descried movable chair has been improved with the development of the welfare society. However, there is room for improvement in the operability of the wheelchair.

More specifically, in the use of a movable chair of this type in daily activities, for a person who has a trouble with his/her legs or the like and cannot stand or walk by himself/herself, mounting/dismounting the chair is a burden and hence is performed with the aid of a helper.

In order to freely perform daily activities by using a such a movable chair, it is required that the center of gravity of a person be freely shifted when the person shifts his/her posture from a sitting posture to a lying posture while sitting on the chair or when the chair travels on a slope such as an upward or downward slope or travels over a stepped portion. However, a satisfactory means to accomplish this shift has not been invented. Therefore, there is a demand for some measure to satisfy these requirements.

In order to satisfy the above-described requirements, it is important to allow a person to mount/dismount the chair and change his/her sitting posture with a minimum force quickly.

It is also required that the above movable chair be easily folded to be carried when the person uses a transportation means such as a vehicle, a train, and an airplane. In addition, a reduction in size and weight of the movable chair is required.

In order to satisfy such requirements, for example, the following types of wheelchairs have been developed: a wheelchair having a back upholstery which can be tilted to a horizontal position; a wheelchair whose seat portion can be freely replaced; and a wheelchair constituted by a foldable bed. However, none of these wheelchairs employ a mechanism for accumulating potential energy in a spring when the seat portion of the chair is lowered, and using the energy to raise the seat portion of the chair. Therefore, new energy is required to raise the chair, and this operation cannot be quickly performed with a small force.

Furthermore, in the conventional wheelchairs and the like, since a folding mechanism is formed independently of a mechanism for vertically moving the seat portion of the chair, the structure of each mechanism is complicated, and an increase in weight and size is inevitably caused. Under the circumstances, demands have arisen for some measures to allow a person who has a trouble with legs or the like and cannot mount/dismount on/from the chair in a standing position by his/her own strength to easily mount/dismount on/-from the chair without a helper.

In addition, when the above-mentioned wheelchair is to be folded, the seat must also be folded. Therefore, a material for the seat cannot be arbitrarily selected because the wheelchair seat should prevent spinal deformation and bedsores, adsorb vibrations, insulate the seated person and be comfortable. Careful consideration must be given to these points.

Furthermore, when the above-described movable chair is to be used as a wheelchair, the following points must also be considered. As conventional movable chairs of this type, movable chairs having various structures have been proposed, e.g., a chair using traveling devices having endless tracks such as crawlers to travel on stairs, slopes, and the like, a chair having such traveling devices attached, as auxiliary devices, to four wheels as main traveling devices, and a chair including sled-like traveling devices having sled-like frames as ground-contact portions to ensure good traveling characteristics and high stability.

However, a general wheelchair of the four-wheel type described above is vertically moved every time each wheel runs over an uneven portion, e.g., a recess or projection, or an obstacle on the track, thus making a person on the chair feel uncomfortable. In addition, the person consumes his/her energy for vertical movement to travel over such obstacles.

In order to travel over large obstacles, the radius of each wheel must be further increased, resulting in an increase in size of the overall wheelchair. Therefore, in order to solve such a problem, it is required that each traveling device be constituted by a device using an endless track such as a crawler or a sled type device.

Such devices will be described in detail below. If endless track or sled type traveling devices are used for a movable chair, the number of ground-contact points of the traveling devices exceeds four. Therefore, as compared with a four-wheel type movable chair, a movable chair of this type can ensure good traveling characteristics and high stability in traveling on tracks having uneven portions such as recesses and projections and obstacles.

According to a movable chair using endless track type traveling devices, for example, in order to travel over an obstacle, an angle defined by a vertical line extending from a contact point of an endless track with respect to the obstacle and a horizonal plane and an tangent on a curved ground-contact portion of the endless track at the contact point is only required to be larger than 0°. Therefore, the problem of the increase in overall size is not posed, unlike the above-described four-wheel type movable chair. However, according to such an endless track type, since almost the entire surface of each crawler is brought into contact with the ground, the movable chair must travel over almost all the recesses and projections on the track, thus posing the problems of energy consumption for vertical movement and uncomfortable vertical motions.

According to the sled type traveling device, the chair can travel over obstacles and the like in the same manner as in the above-described endless track type, and the problem of the increase in size as in the four-wheel type is not posed. In addition, the sled type is simpler in structure than the endless track type. Furthermore, when the movable chair using the sled type traveling devices travels on the track having recesses and tracks, it moves forward while higher projections are interposed between sled. Therefore, energy consumption for vertical movement and vertical motions are small. However, the movable chair using the sled type traveling devices is greatly influenced by friction and the like between the ground-contact surfaces and the ground. In addition, when the chair travels over recesses and projections, forward/backward swinging motions are increased as the heights of the projections vary in the traveling direction. Furthermore, when the friction between the ground-contact surfaces and the ground is small, the movable chair using the sled type traveling devices tends to slide and hence is difficult to control.

On the other hand, since a movable chair of this type often travels on tracks having recesses and projections in traveling indoors and outdoors, it is required to minimize the energy consumption for vertical movement and vertical motions in traveling as well as reducing the overall size. In addition, it is required that a movable chair be smoothly moved in traveling, and that traveling control on stairs or a slope be performed in a predetermined state. Therefore, almost no movable chairs using endless track and sledge type traveling devices have been put into practice, although they are superior to a general four-wheel type wheelchair in traveling characteristics and stability. Under the circumstance, the advantages and disadvantages of various types of traveling devices for these conventional movable chairs must be reexamined as a whole, and some measures need to be taken to solve all the problems described above.

One of the problems posed in the above-described movable chairs using the endless track and sled type traveling devices is that none of these traveling devices can change their directions separately and independently at each ground-contact portion. If, therefore, such traveling devices are employed, a serious problem is posed in terms of a direction change operation.

More specifically, a movable chair having such traveling devices cannot change its traveling direction in the same manner as in the four-wheel type for the above-described reason. In order to change the traveling direction, the movable chair must be rotated about one ground-contact portion of one of the traveling devices by forcibly moving other ground-contact portions against the friction. This direction change operation is difficult to perform.

On the other hand, since movable chairs of this type often pass through narrow places indoors and outdoors, and are often required to change their traveling directions in such narrow places, as described above, the problem in direction change operations is a great obstacle to practical applications. For this reason, almost no movable chairs using endless track and sledge type traveling devices have been put into practice, although they are superior to a general four-wheel type wheelchair in traveling characteristics and stability. Therefore, some measures are required to easily perform such direction change operations.

For example, the traveling direction of traveling devices using endless tracks such as crawlers is changed by rotating the left and right crawlers in opposite directions. According to such endless track type traveling devices, however, the contact area between each crawler and the ground is large, and a large operating force is required to perform a direction change operation because the rotation of each crawler is hindered by the friction between the crawler and the ground, unlike a wheel-type movable chair. Especially on surfaces causing high frictional resistance, e.g., gravel, sandy, and snowy roads, direction change operations are difficult to perform. In addition, a floor surface is damaged by friction.

SUMMARY OF THE INVENTION

It is a principal object of the present invention to provide an improved movable chair which can ensure a feeling of stable riding.

It is another object of the present invention to provide a movable chair which causes only few vertical motions or swinging motions.

It is still another object of the present invention to provide a movable chair which can change its traveling direction within a small space.

It is still another object of the present invention to provide a movable chair which has a simple structure and can quickly change its traveling direction.

It is still another object of the present invention to provide a movable chair which can be folded by a simple operation.

It is still another object to provide a movable chair which can solve the various problems described above with a simple structure.

In order to achieve these objects, according to the present invention, there is provided a movable chair comprising a chair main body having a seat portion, and a pair of left and right traveling devices, disposed on left and right sides of the chair main body, for moving the chair main body while supporting the chair main body, the traveling devices including traveling frames disposed along a traveling direction, endless rail portions respectively disposed around the traveling frames, endless tracks respectively wound around the endless rail portions, driving means for driving the endless tacks, and means for allowing a sitting person to control the driving means, and the endless tracks including endless driving belts, and a plurality of ground-contact feet mounted on the endless driving belts and having different shapes.

DESCRIPTION OF THE PREFERRED EMBODIMENTS

Figure 1:
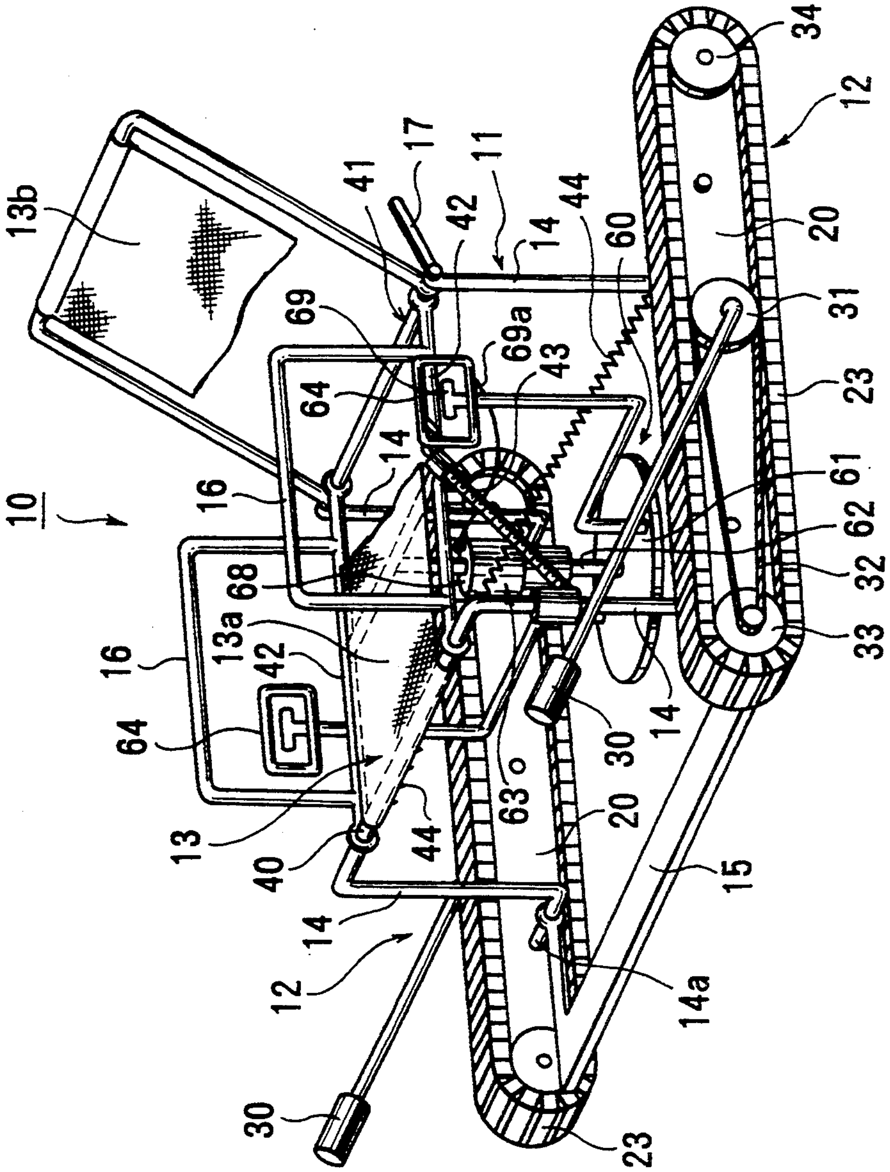
FIG. 1 is a schematic perspective view for explaining the overall arrangement of a movable chair according to an embodiment of the present invention.

FIGS. 1 to 5 show a folding mechanism of a movable chair according to the first embodiment of the present invention. The overall schematic arrangement of a movable chair denoted by reference numeral 10 as a whole will be briefly described below with reference to FIGS. 1 to 5.

The movable chair 10 includes a chair main body 11 constituted by a plurality of pipe members to be foldable, a pair of left and right traveling devices 12 which make contact with the ground while supporting the chair main body 11 from below and is designed to cause the chair main body 11 to travel, and the like. Reference numerals 13*a* and 13*b* respectively denote seat-like members constituting a seat portion 13 on which a person sits. The seat portion 13 is stretched over the seat cushion portion (sitting portion) and seat back portion (back upholstery portion) of the chair main body 11 constituted by the pipe members. In addition, a footplate 15 is disposed across the lower front sides of leg portions 14 constituting the chair main body 11, and armrest portions 16 are attached to the two sides of the cushion portion of the seat portion 13 of the chair main body 11. Note that reference numeral 17 denotes the lever of a reclining mechanism for adjusting the tilting angle of the seat back portion.

The above-mentioned seat-like members 13*a* and 13*b* are not limited to cloth-stretched structures, but detachable seat members may be properly disposed as separate structures. As such seat members, members are to be properly selected to satisfy various requirements, e.g., the prevention of spinal deformation of a sitting person, the prevention of bedsore, vibration absorption, heat insulation, and the satisfaction of a feeling of comfort in sitting.

Figure 2:
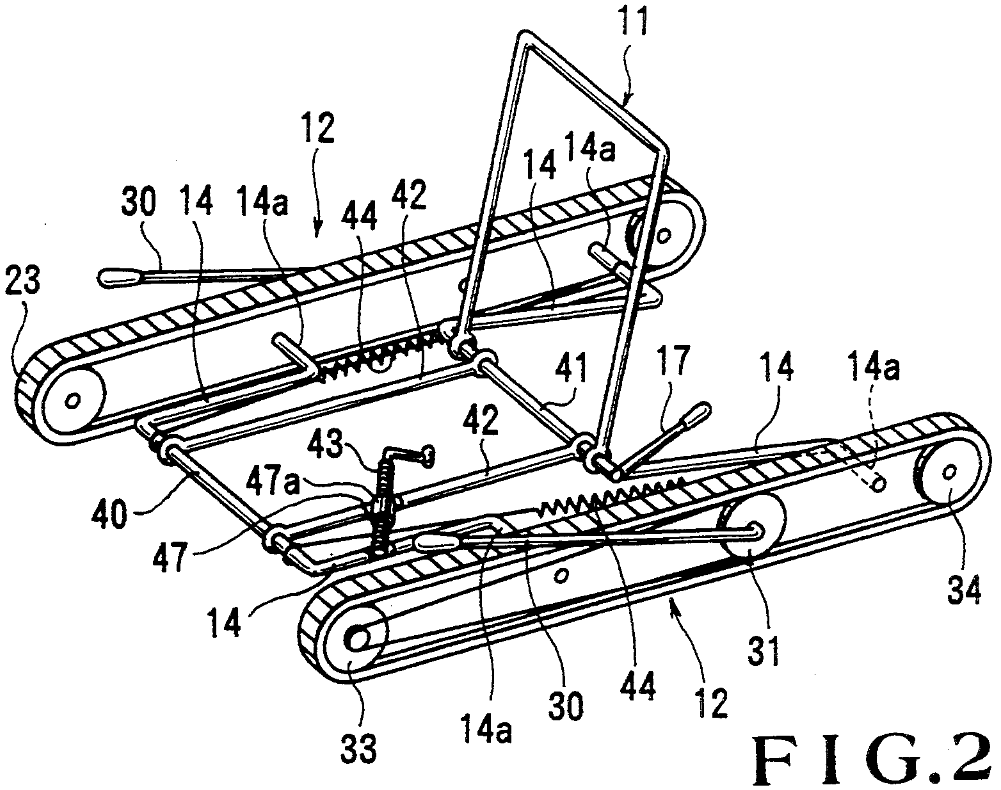
FIG. 2 is a schematic perspective view for explaining the operation of the movable chair of the present invention.
Figure 3:
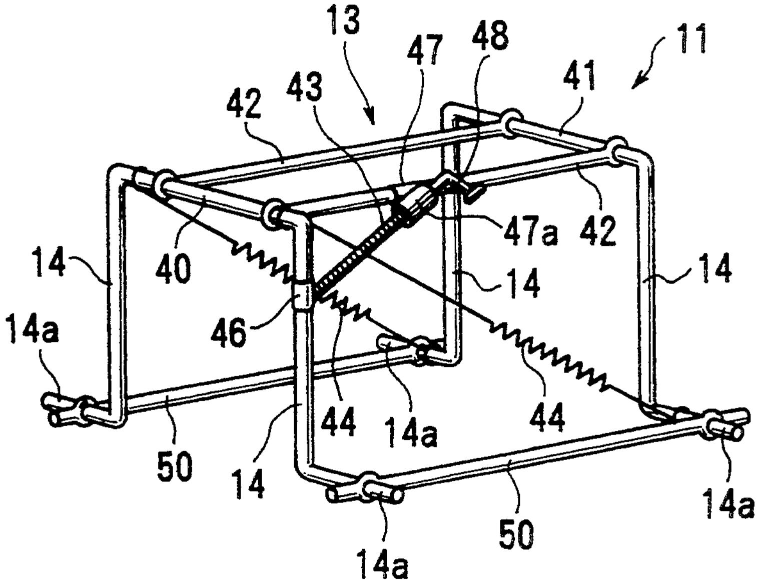
FIG. 3 is a schematic perspective view showing a frame structure of the movable chair, which characterizes the present invention.
Figure 4:
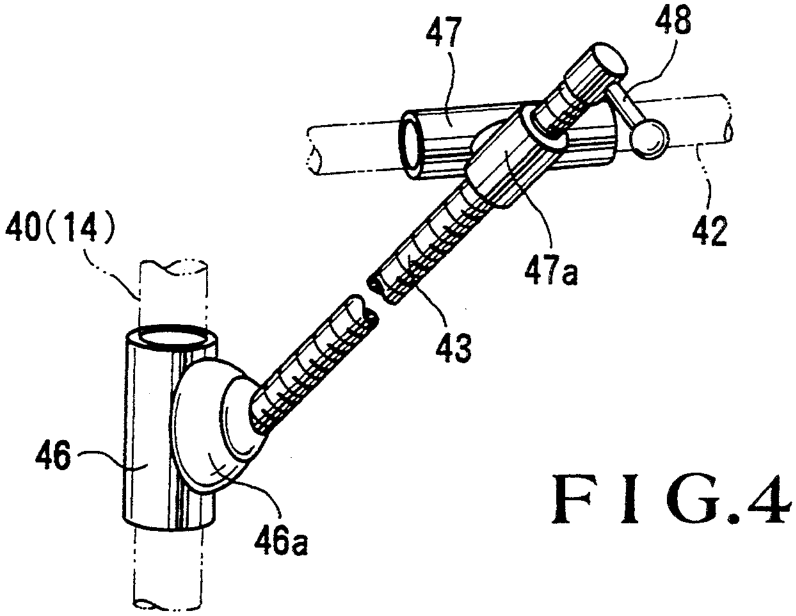
FIG. 4 is a schematic perspective view showing the structure of an extendible coupling lever for adjusting the height of the chair and performing a folding operation.
Figure 5:
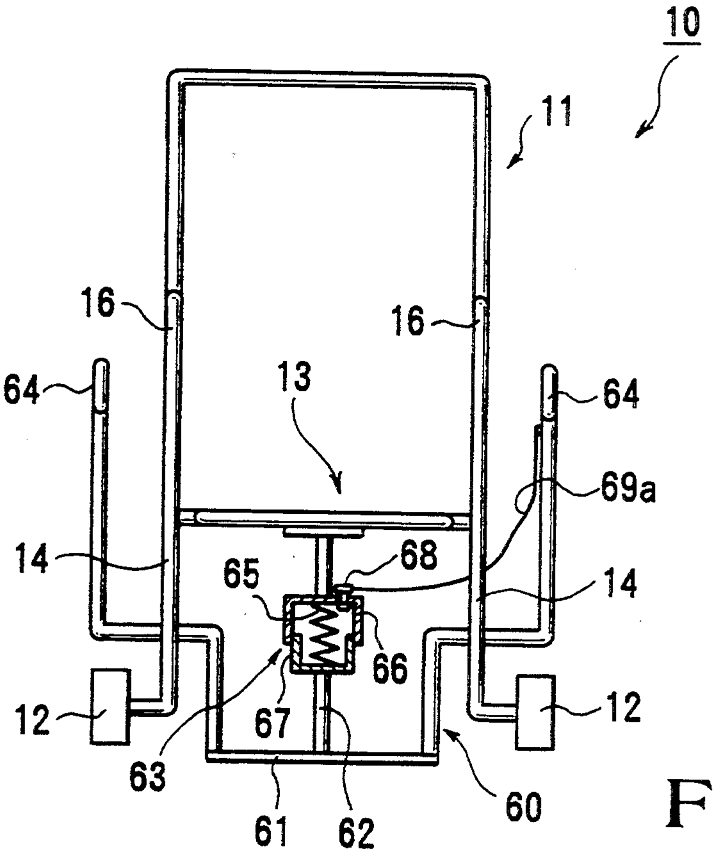
FIG. 5 is a schematic front view of the movable chair in FIG. 1.

According to the present invention, as is apparent from FIGS. 2 to 4, the movable chair 10 having the arrangement shown in FIG. 1 is characterized by two pairs of front and rear leg portions 14 respectively having lower end portions 14*a* supported, as rotatable axial support portions, on the left and right traveling devices 12; front and rear crank shafts 40 and 41 constituting the leg portions 14; coupling frames 42 (constituted by two pipe members 42 in this embodiment) arranged between the horizontal portions of the front and rear shafts 40 and 41 to constitute the seat portion 13 and pivotally coupled to the shafts 40 and 41; a coupling lever 43 constituted by a screw shaft disposed between the leg portion 14, connected to the shaft 40, and the coupling frame 42 to be extendible, capable of adjusting an extendible amount, and designed to integrally couple the two members to each other at each adjusted position; and biasing means 44 constituted by tension springs or the like disposed between the horizontal portion of the front shaft 40 and the lower end portions of the leg portions 14 of the rear shaft 41 and designed to provide a biasing force to maintain each leg portion 14 in an almost vertical sitting position in a normal operation period during which a person is sitting on the chair.

The above-mentioned coupling lever 43 constituted by the screw shaft is a member constituting a folding-/adjusting mechanism for folding the seat portion 13 of the chair main body 11 by vertically moving the seat portion 13 against the biasing force of the biasing means 44. As is apparent from FIG. 4, one end of the coupling lever 43 is coupled to a fitting holder 46, held on the leg portion 14, through a universal joint 46*a,* while the other end portion of the lever 43 is threadably engaged with a nut holder 47*a* to extend therethrough. The nut holder 47*a* is movably attached to a fitting holder 47, fitted and fixed on the pipe member as the coupling frame 42, through a universal joint or the like. An operating portion 48 is fixed to the distal end of the other end portion of the coupling lever 43. With this arrangement, by rotating the coupling lever 43 to cause it to extend/contract, the height position of the seat portion 13 can be arbitrarily moved upward and downward between the positions respectively shown in FIGS. 1 and 2 to adjust the position of the chair main body 11 constituted by the above-mentioned pipe members, while the positional relationship between the respective members is kept constant in each adjusted position of the chair main body 11.

Referring to FIG. 3, reference numerals 50 denote coupling lower shafts for coupling the lower end portions of the leg portions 14 of the front and rear crank shafts 40 and 41 to each other so as to couple the lower end portions on the front side to those on the rear side. With this structure, the chair main body 11 constitutes a parallel link mechanism and hence can change its position from a vertical position to a horizontal position.

According to such an arrangement, the parallel link mechanism constituted by the front and rear frames 40 and 41, the coupling frames 42, and the traveling devices 12 can constitute a mechanism for vertically moving the coupling frames 42 constituting the seat portion 13 in accordance with an erecting/lying operation of the leg portions 14 by adjusting the extendible amount of the extendible coupling lever 43. As the coupling frames 42 are moved downward, the biasing force of the biasing means 44 is accumulated so that when the coupling lever 43 is adjusted in the extending direction again, the overall frames 42 can be lifted to the previous position by the biasing force accumulated during the downward movement of the frames 42, and the respective legs 14 are raised upright and restored to the normal posture.

A mechanism/operation for moving the position of the center of gravity of a person sitting on the chair main body 11 having the above-described arrangement will be described below.

While each respective leg 14 is set in a vertical position, although a change in height of the seat portion 13 is small, the seat position is greatly moved in the horizontal direction with respect to the point where the leg portion 14 of the chair main body 11 comes into contact with the ground. Therefore, even if the seat back portion of the chair main body 11 is set in a reclining position, and the person shifts his/her center of gravity backward to lie on his/her back, the position of the seat portion 13 can be moved forward to shift the center of gravity forward, thus preventing the movable chair 10 from falling backward. In addition, when the movable chair 10 is to travel on a slope or the like, the center of gravity must be shifted forward to ascend the slope and vice versa. In this case, the center of gravity can be moved forward or backward by tilting the leg portions 14 of the chair main body 11 forward or backward.

The energy consumption in such operations will be described below.

In the process of forming the chair main body 11, each tension spring as the biasing means 44 is set in a contracting state to have a predetermined initial value while the seat portion 13 of the chair main body 11 is set at the highest position. That is, a certain initial value of energy is accumulated in each spring 44. Thereafter, a weight or the like is placed on the seat portion 13 to apply a force other than the weight of a person to the seat portion 13. As a result, the position of the seat portion 13 is lowered, and the corresponding energy is accumulated in each tension spring 44. At this time, the adjusting mechanism constituted by the coupling lever 43 described above prevents each tension spring 44 from returning to its initial state.

Subsequently, when the person sits on the chair, and the screw of the coupling lever 43 is loosened in this state, the energy accumulated in each tension spring 44 is converted into potential energy. Therefore, the seat portion 13 can be lifted by applying small energy newly generated by the muscular power of the person sitting on the chair. Especially, since some person physically handicapped by his/her legs or the like has a low muscular strength in his/her arms, the ability of changing the posture of the chair main body 11 with small muscular energy is one of the important factors.

According to the movable chair 10 having the above-described arrangement, by operating the coupling lever 43 to fold the chair main body 11, the seat portion 13 can be lowered to a position near the ground. At this position, a person physically handicapped by his/her legs or the like can safely and easily mount on the seat by his/her own strength. Thereafter, the chair main body 11 can be shifted to the normal sitting position by using the energy accumulated in the springs 44.

In this case, as an angle $\theta$ defined between the leg portion 14 and the horizonal plane is small, the force of each tension spring as the biasing force 44, which serves to raise the leg portion 14, is small. It is preferable that the angle $\theta$ not be set to be too small. However, the angle $\theta$ may be decreased depending on a folding state of the chair main body 11, and the biasing means 44 may not effectively function. In such a case, the screw shaft as the coupling lever 43 described above can be effectively used to raise the leg portions 14 of the chair main body 11 in the following manner. The coupling lever 43 is rotated first in the extending direction to increase the angle $\theta$, thus raising the chair main body 11. When the angle $\theta$ is increased to a certain value, the tension springs 44 begin to function to raise the seat portion 13 to the normal height position, thus setting the chair main body 13 in the normal sitting posture. In this case, after the angle $\theta$ is increased to a certain value, and the acting force generated by the tension springs 44 is increased, the rotating operation of the coupling lever 43 can be performed with small force, thus posing no problems in terms of operation.

When the height position of the seat portion 13 of the chair main body 11 is to be lowered, the screw shaft of the coupling lever 43 is rotated to be gradually loosened. With this operation, the leg portions 14 are inclined. In this case, even if the angle $\theta$ is decreased, since the screw of the coupling lever 43 serves as a stopper, there is no possibility that the chair main body 11 is folded or the seat portion 13 falls down.

When the seat back portion of the chair main body 11 is to be inclined backward, the chair main body 11 can be prevented from falling backward by shifting the center of gravity of a person forward beforehand in a state wherein the screw of the coupling lever 43 is fastened and reliably locked.

When the folding mechanism of the chair main body 11 is to be operated, the above-mentioned armrest portions 16, a direction change device 60 (to be described later), and the like may interfere with the operation. In such a case, these members are preferably designed as detachable or pivotal/movable members so as not to interfere with a folding operation of the chair main body 11.

According to the above-described arrangement, when the position of the center of gravity of a sitting person needs to be shifted under various conditions in daily activities using the movable chair 10, the relative positions of the leg portions 14 of the chair main body 11 and the seat portion 13 can be easily changed by his/her own strength accordingly, thereby maintaining the total balance and preventing the chair from falling. In addition, according to the above-described arrangement, the overall structure of the movable chair 10 can be simplified, and hence a reduction in size and weight of the chair can be achieved to allow easy movement and transfer of the chair, thus increasing the degree of freedom in daily activities of a person having a trouble with his/her legs or the like.

Furthermore, according to the above-described structure, since the seat portion 13 need not be folded, unlike in the conventional wheelchair, when the chair 10 is to be folded, the function of a seat member to be mounted on the seat portion 13 can be arbitrarily selected, thereby providing a seat capable of satisfying medical requirements and ensuring a feeling of comfort.

In the above-described embodiment, the lower end portions of the leg portions 14 of the front and rear shafts 40 and 41 are coupled to each other through the coupling lower shafts 50. However, the present invention is not limited to this. It is easily understood that if the lower end portions of the front and rear leg portions 14 are axially supported on left and right traveling frames 20 (to be described later), of the traveling devices 12, each of which is continuously formed to extend along the forward/backward direction, the lower shafts 50 can be omitted.

Furthermore, according to the present invention, the coupling lever 43 is constituted by a screw shaft, and the amount extended is adjusted by rotating the screw shaft. However, the present invention is not limited to this. For example, a jack type coupling lever mechanism may be used. That is, any mechanism may be used as long as it can couple the leg portions 14 constituting the parallel link mechanism to the coupling frames so as to be extendible while maintaining its state.

Moreover, according to the present invention, in the movable chair 10 having the above-described arrangement, each of the traveling devices 12, which makes contact with the ground while supporting the chair main body 11 having the seat portion 13 and is designed to move the chair main body 11, has the arrangement shown in FIGS. 6 to 12.

The arrangements of the traveling devices 12 will be described in detail below. The traveling devices 12 have the following characteristic features. The traveling devices 12 include a pair of left and right traveling frames 20 and endless tracks 23. The traveling frames 20 are elongated along the traveling direction. The leg portions 14 of the chair main body 11 are coupled to the traveling frames 20. In addition, the traveling frames 20 have endless rail portions 20*a*, each of which has a substantially T-shaped cross-section and is continuously constituted by upper and lower edge portions and actuated end portions coupling the upper and lower edge portions at the two ends. Each endless track 23 is constituted by a plurality of ground-contact feet 21 and 22 which are moved along the endless rail portion 20*a* formed on the circumferential portion of each traveling frame 20. Of these ground-contact feet 21 and 22, at least two feet located on the lower edge portion of each traveling 20 are in contact with the ground, as shown in FIG. 1 according to the characteristic feature of the present invention.

In this embodiment, the plurality of ground-contact feet 21 and 22 are constituted by at least two types of ground-contact feet, i.e., high and low ground-contact feet 21 and 22 having different heights from their contact points with respect to the endless rail portion 20*a* of the traveling frame 20 to the ground-contact points. In addition, the plurality of ground-contact feet 21 and 22 are disposed at predetermined intervals on the endless rail portion 20*a* of the traveling frame 20 while they are coupled to each other through a driving belt 24 as an endless belt.

Referring to FIGS. 1 to 6, reference numerals 30 denote driving levers for driving the endless tracks 23. When a sitting person swings each lever 30, a driving force in one direction is transmitted to a driving mechanism 31 (only one side is shown) having a one-way clutch or a reduction gear mechanism. The pivoting force is then transmitted to a transmission gear portion 33*a* of a driving gear 33, axially supported on the front end portion of the traveling frame 20, through a transmission belt 32 such as a chain. When the driving gear portion of the driving gear 33, which is rotated by the pivoting force, is meshed with the ground-contact feet 21 and 22 constituting the endless track 23, the ground-contact feet 21 and 22 are moved around the frame 20, thus moving the movable chair 10. Note that reference numeral 34 denotes a braking gear having a brake mechanism 35 (not shown) or the like and designed to stop the movement of the endless track 23. For example, a braking lever 36 coupled to the braking gear 34 through a wire 36*a* or the like may be attached to the driving lever 30 (FIG. 6) at a position where a sitting person can manually operate the lever 36. With this arrangement, each endless track 23 can be stopped to stop the movable chair 10 from traveling.

Figure 6:
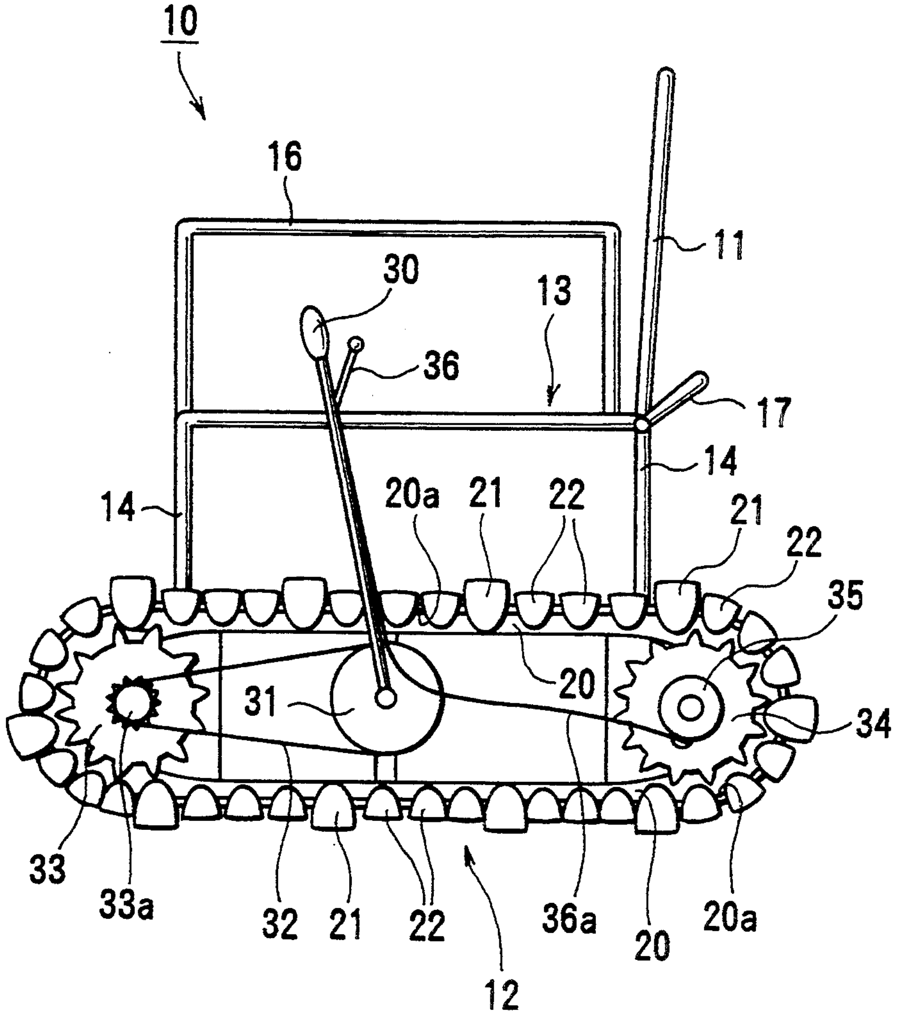
FIG. 6 is a schematic side view showing an embodiment of a traveling device of the movable chair of the present invention.
Figure 7:
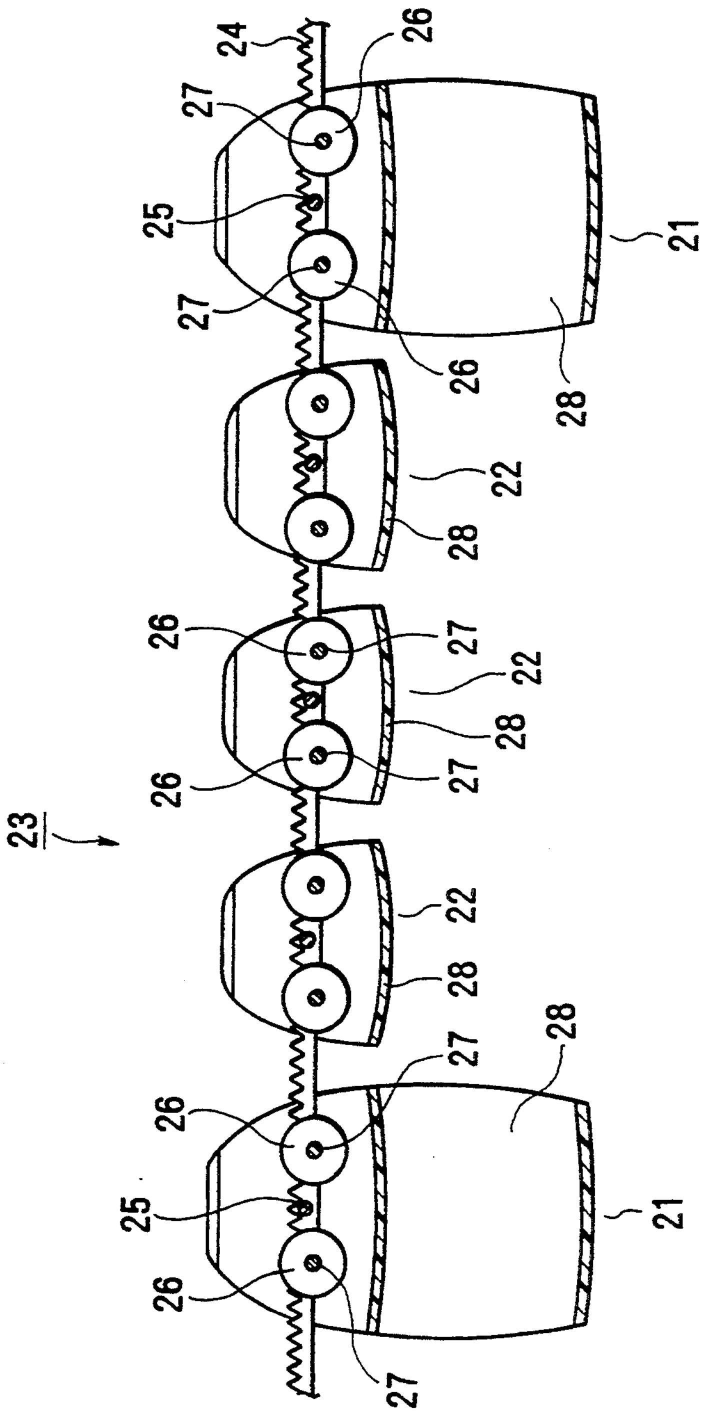
FIG. 7 is a schematic enlarged view showing the arrangement of a main part of the present invention.
Figure 8A:
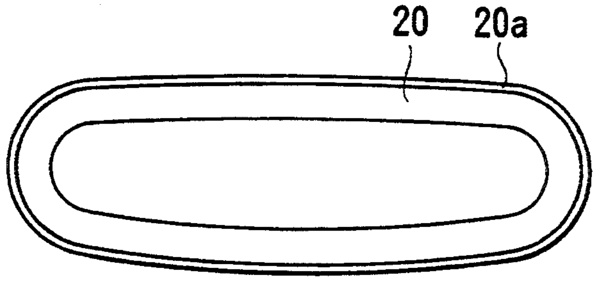
FIGS. 8(*a*) and 8(*b*) are a side view and a plan sectioned view, respectively, showing a traveling frame used for the present invention.
Figure 8B:
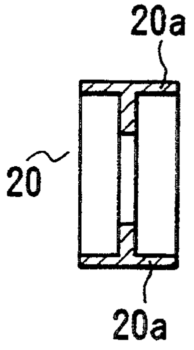
Figure 9A:
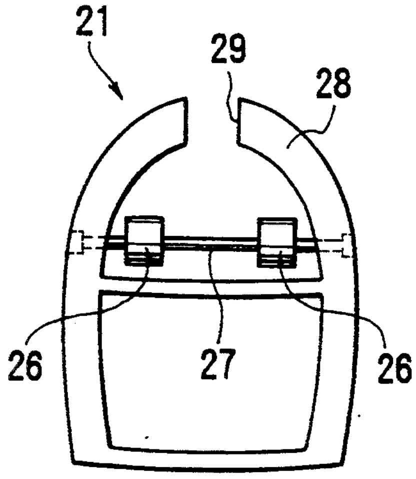
FIGS. 9(*a*) and 9(*b*) are a schematic front view and a cross-sectional view, respectively, showing a high ground-contact foot.
Figure 9B:
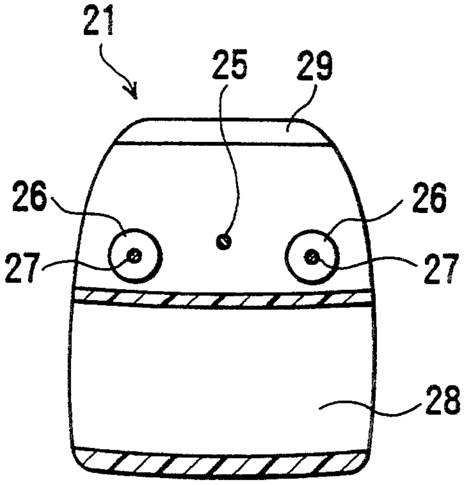
Figure 10A:
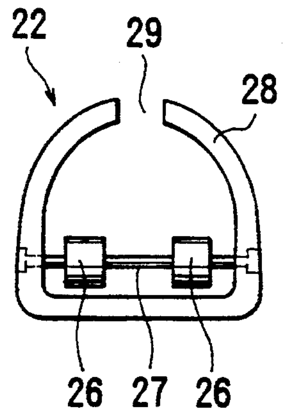
FIGS. 10(*a*) to 10(*c*) are a schematic front view, a side sectional view, and a schematic plan view, respectively, showing a low ground-contact foot.
Figure 10B:
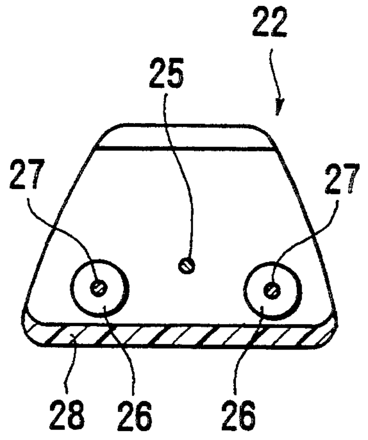
Figure 10C:
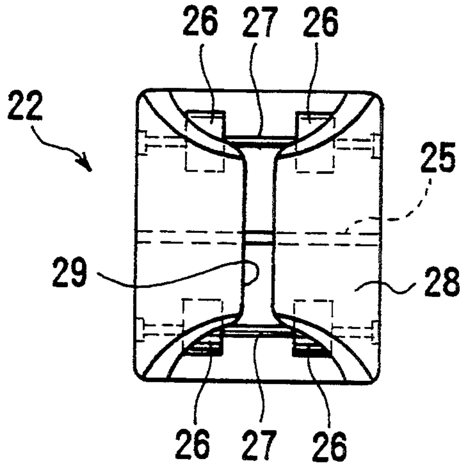
Figure 11:
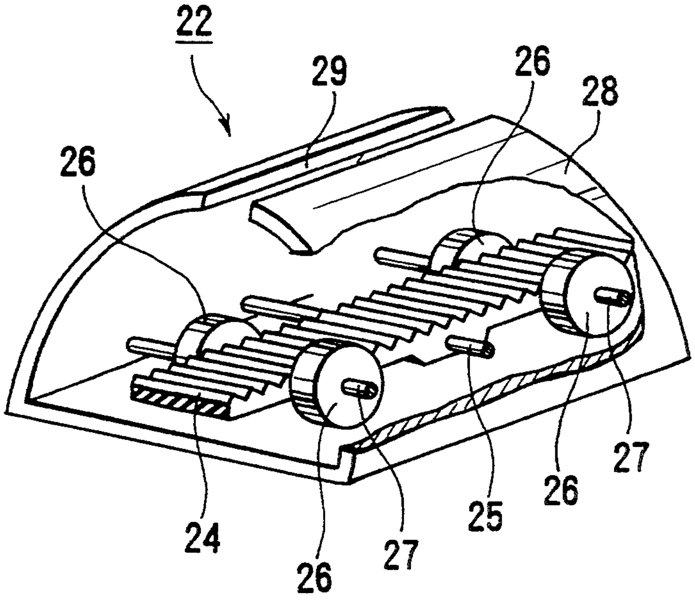
FIG. 11 is a schematic perspective view for explaining the schematic arrangement of a ground-contact foot.
Figure 12:
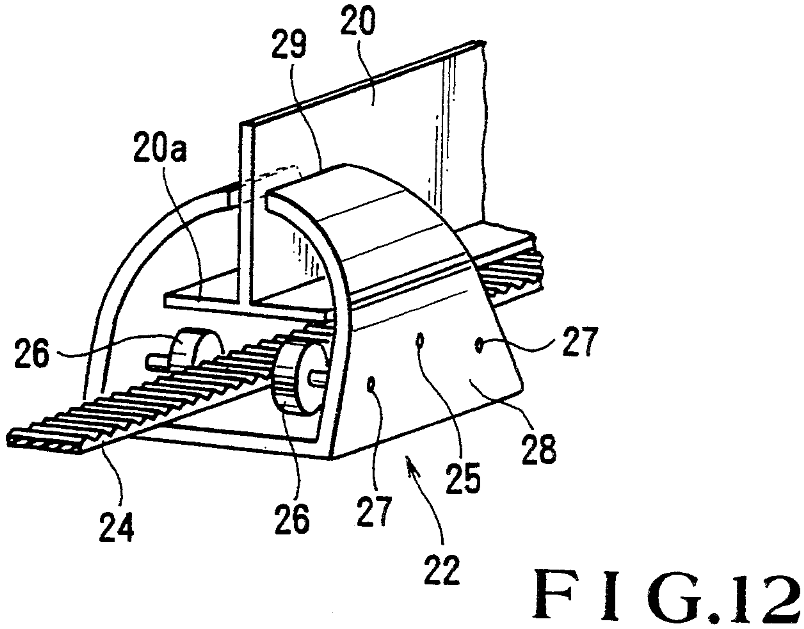
FIG. 12 is a schematic perspective view showing only a main part for explaining a state wherein the ground-contact foot is mounted on the traveling frame.
Figure 13:
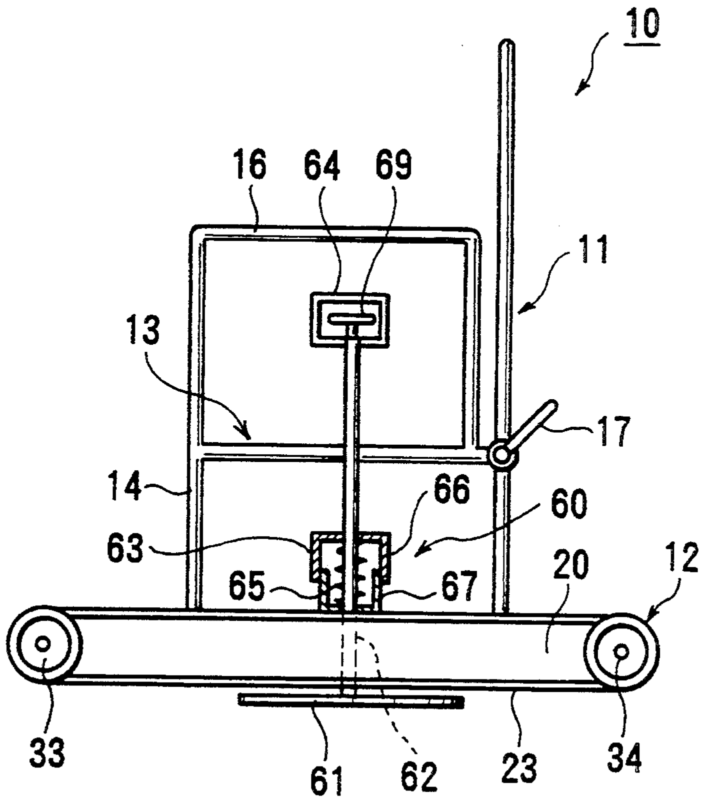
FIG. 13 is a schematic side view of the movable chair in FIG. 5.

Each traveling frame 20 described above has the shape shown in, e.g., FIGS. 6 and 8. The above-described endless rail portion 20*a* is formed on the circumferential portion of the traveling frame 20. The ground-contact feet 21 and 22 are disposed on the endless rail portion 20*a* while they are slidably coupled to each other through the driving belt 24, as shown in FIG. 7 and FIGS. 9(*a*) to 12. Note that reference numerals 25 denote pivot pins for pivotally supporting the feet 21 and 22 on the driving belt 24; and 26, rollers axially supported on foot main bodies 28, constituting the feet 21 and 22, by axial support pins 27 which are supported independently of the driving belt 24. These rollers 26 are designed to roll in contact with the endless rail portion 20*a* of the traveling frame 20 so as to smoothly move the feet 21 and 22. Referring to FIG. 12, reference numeral 29 denotes an engaging groove to be engaged with the rail portion 20*a* of the frame 20. Each of the feet 21 and 22 described above is slidably held by the rail portion 20*a* of the frame 20, which is inserted in the engaging groove 29, so as not to be removed with some backlash ensured.

According to the traveling device 12 having the above-described arrangement, when the feet 21 and 22 slidably disposed along the endless rail portion 20*a* formed on the circumferential portion of the frame 20 supporting the chair main body 11 are sequentially moved along the rail portion **20*a*, each traveling frame 20 and the chair main body 11 supported thereon are moved in a predetermined direction. In other words, the traveling frame 20 relatively moves on a bridge girder constituted by at least two contact feet 21 and 22 (the high feet 21 in practice). Each of the ground-contact feet 21 and 22 which has completed its role as a part of a bridge girder is fed through the endless rail portion 20*a* formed on the circumferential portion of the frame 20. In addition, the traveling device 12 having the above-described arrangement is similar to the conventional sledge type frame because each traveling frame 20 is fixed. However, since the sliding means (the rollers 26) such as rollers and bearings are disposed between the frame 20 and the ground-contact feet 21 and 22**, the friction therebetween can be minimized. Therefore, the advantage of the frames of the present invention is obvious.

In addition, according to the above-described arrangement, since each traveling device travels on a bridge girder constituted by at least two feet 21 and 22, it need not travel over all recesses and projections on the ground. Therefore, each traveling device of this embodiment suffers less vertical motions and requires less energy consumption than the conventional traveling device. In this case, with an increase in distance between the two feet 21 and 22 constituting a bridge girder, the traveling device is less susceptible to the influence of recesses and projections on the ground. Especially, the arrangement according to the present invention can minimize necessity to sequentially travel down along recesses in the track, unlike the conventional device. Therefore, there is no need to consume energy to escape from each recess, providing great advantage.

Furthermore, unlike an endless track system, no mechanisms such as wheels for moving crawlers are required, and hence the mechanism and arrangement can be simplified.

According to the structure of the above-described embodiment, since two types of ground-contact feet 21 and 22, i.e., high and low feet, are used, the influences of low obstacles and the like, of obstacles, recesses, and projections on the track, can be avoided owing to the height of the high feet 21, thereby allowing smooth traveling with the minimum necessary force while reducing vertical motions. In this case, the arrangement span of the high feet 21 is preferably maximized under required conditions. With this increase in span, great advantage can be obtained because energy required to travel over obstacles and projections need not be consumed and accompanying shocks and the like are not produced unless the high feet 21 ride on the projections and the like, unlike the conventional device.

In addition, in this arrangement, since the lengths of the ground-contact feet 21 and 22 are equal to each other, swinging motions in the horizontal direction are reduced as compared with the sledge type traveling device.

Furthermore, since the friction coefficient between the ground-contact feet 21 and 22 and the ground can be increased, there is no possibility of sliding down a downward slope, e.g., a sloping road or stairs, thereby allowing relatively easy traveling control such as braking.

In this embodiment, assume that ground-contact feet, especially high feet 21, are disposed at intervals of about 30 cm on the traveling device 12 having a length of about 90 cm. In this case, it is empirically confirmed that the vertical motions and horizontal swinging motions produced upon traveling on a general uneven road can be greatly reduced as compared with the conventional device.

Recesses and projections on general roads are constituted most by the joints between blocks or bricks covered on footpaths, and gravel on gravel roads come next. It is confirmed that traveling on such uneven roads can be smoothly performed by setting the distance between the high and low feet 21 and 22 to be 2 cm or so.

In the above-described embodiment, the seat portion 13 disposed on the traveling devices 12 is moved by moving the endless tracks 23, each formed as the traveling device 12 of the movable chair 10 by coupling the two types of feet 21 and 22, i.e., the high and low feet, at the predetermined intervals, along the traveling frames 20 using the driving belts 24. However, the present invention is not limited to this. For example, feet having the same height may be disposed at proper intervals, or a large number of feet may be disposed in tight contact with each other. In addition, even with such endless tracks 23, traveling devices having various structures can be arbitrarily used as long as they are designed such that a plurality of ground-contact feet are slidably held around the frames 20, and the frames 20 and the chair main body 11 supported thereon can be caused to relatively travel by moving the ground-contact feet.

Furthermore, in the above-described embodiment, a sitting person causes the traveling devices to travel by operating the driving levers 30 by his/her own strength. However, the present invention is not limited to this. It is apparent that a person other than a sitting person may push the movable chair 10 to help the sitting person so as to complement the total kinetic energy required for traveling.

Moreover, according to the present invention, the direction change device 60 of the movable chair 10 has the arrangement shown in FIGS. 1, 5, 13, and 14. More specifically, the direction change device 60 comprises a direction change disk 61 disposed to be vertically movable and selectively brought into contact with the ground at a position corresponding to the central portion of the seat cushion portion, which is different from the traveling devices 12 which support the chair main body 11 from below and is brought into contact with the ground; a rotating shaft means 62 for coupling the chair main body 11 onto the disk 61 to allow the chair main body 11 to be relatively moved; an elevating mechanism 63 interposed between the chair main body 11 and the direction change disk 61 and designed to vertically move the disk 61 below the chair main body 11; and sticks 64 to be selectively used to partially or completely support the weight of a person sitting on the seat portion 13 of the chair main body 11 above the ground.

The direction change device 60 having such an arrangement is characterized in that when a person sitting on the seat portion 13 of the chair main body 11 shifts his/her weight to the sticks 64 through his/her arms, the elevating mechanism 63 is operated to lower the direction change disk 61 so as to increase the distance between the disk 61 and the seat portion 13 of the chair main body 11 up to a value longer than the distance between the ground-contact surface of each traveling device 12 to the seat portion 13, so that the direction of the chair main body 11 and the traveling devices 12 lifted from the ground is changed by the rotating shaft means 62.

According to the embodiment, as is apparent from FIGS. 5 and 13 or FIGS. 15 to 17, the elevating mechanism 63, of the direction change device 60, designed to hold the disk 61 below the chair main body 11 so as to allow the disk 61 to be vertically movable is constituted by a compression spring 65, a pair of upper and lower cylindrical members 66 and 67, a valve mechanism 68. The compression spring 65 is a spring means for applying a biasing force in the vertical direction to separate the chair main body 11 and the disk 61 from each other. The maximum pressing force of the spring 65 is smaller than the sum of the weights of a person M sitting on the seat portion 13 of the chair main body 11, the chair main body 11, and the traveling devices 12 below the chair main body 11, while the spring force of the spring 65 is larger than the sum of the weights of the chair main body 11 and the traveling devices 12. The cylindrical portions 66 and 67 are fitted to each other with the compression spring 65 interposed therebetween and are respectively coupled to the chair main body 11 and the disk 61 to form a closed space constituting an air damper mechanism. The valve mechanism 68 serves as an exhaust valve to be selectively opened/closed upon a lever operation so as to cause the closed space (air damper) in the cylindrical members 66 and 67 to communicate with the outside or to shut the closed space from the outside. Note that reference numeral 69 denotes an operation lever disposed on the upper end of each stick 64 described above and designed to open/close the valve mechanism 68 through a wire 69*a*.

When the compression spring 65 is fully extended, the distance between the ground-contact surface of the disk 61 and the chair main body 11 becomes longer than the distance between the ground-contact surface of each traveling device 12 and the chair main body 11. In contrast to this, when the compression spring 65 is fully contracted, the distance between the ground-contact surface of the disk 61 and the chair main body 11 becomes shorter than the distance between the ground-contact surface of each traveling device 12 and the chair main body 11.

In addition, the rotating shaft means 62 is to be designed to couple the direction change disk 61 to the chair main body 11 and the traveling devices 12 such that they are rotatable about the vertical axis to be relatively pivotal in the horizontal direction. Although the detailed structure of the rotating shaft means 62 is omitted, a known bearing structure and the like may be properly employed.

Figure 15A:
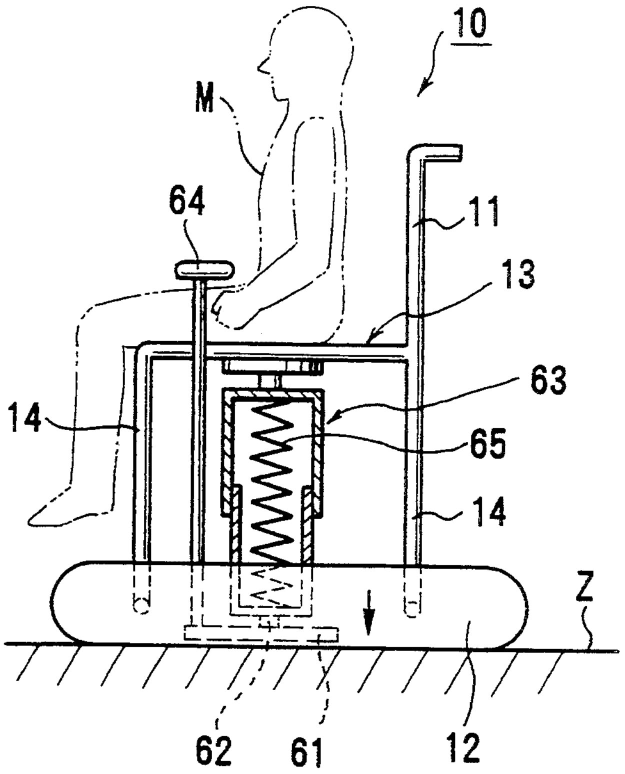
FIGS. 15(*a*) and 15(*b*) are views for explaining an operation of a direction change device according to the present invention, in which FIG. 15(*a*) is a schematic side view showing a sitting state of a person on a seat portion, and FIG. 15(*b*) is a schematic front view thereof.
Figure 15B:
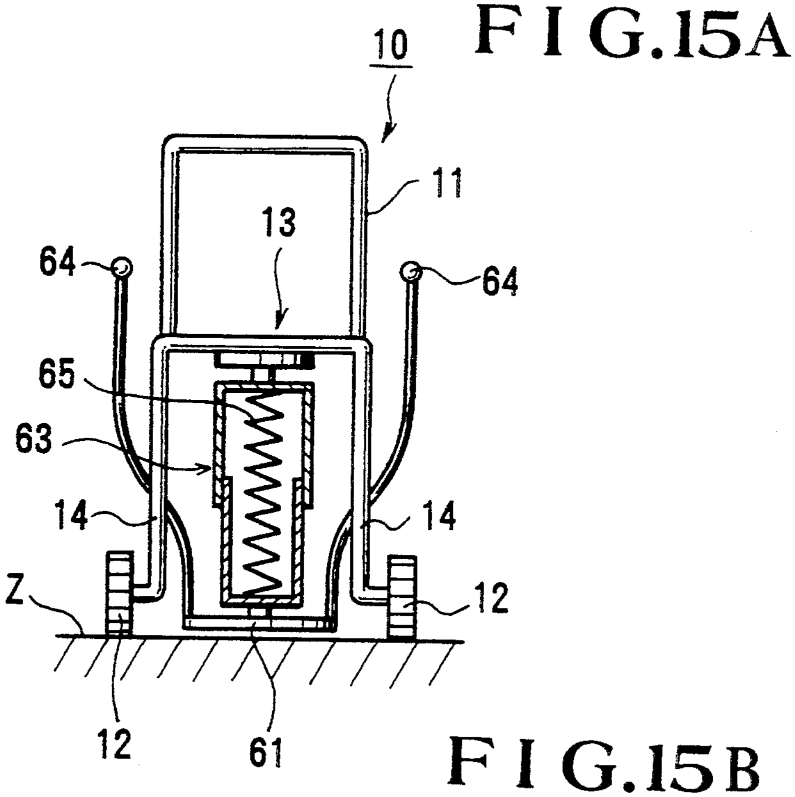
Figure 17A:
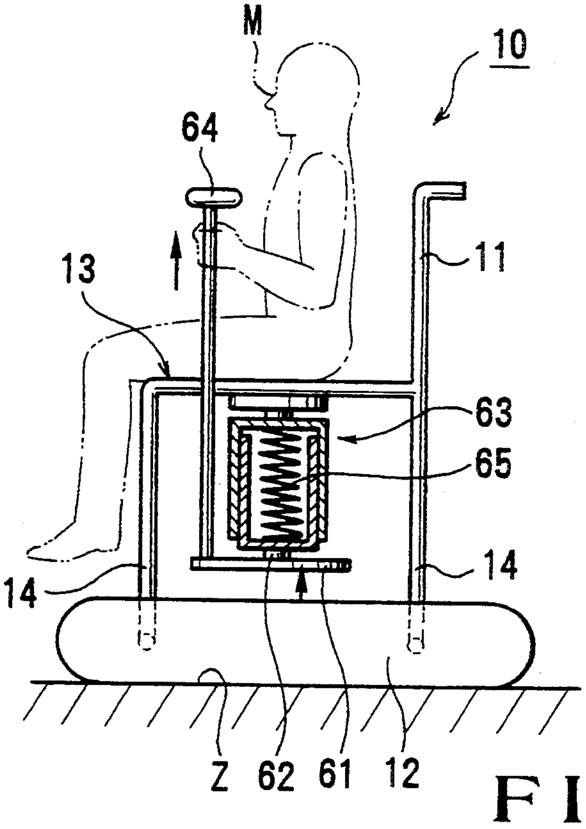
FIGS. 17(*a*) and 17(*b*) are views for explaining an operation of the direction change device according to the present invention, in which FIG. 17(*a*) is a schematic side view showing a state wherein the sitting person forcibly lifts the sticks, and FIG. 17(*b*) is a schematic front view thereof.
Figure 17B:
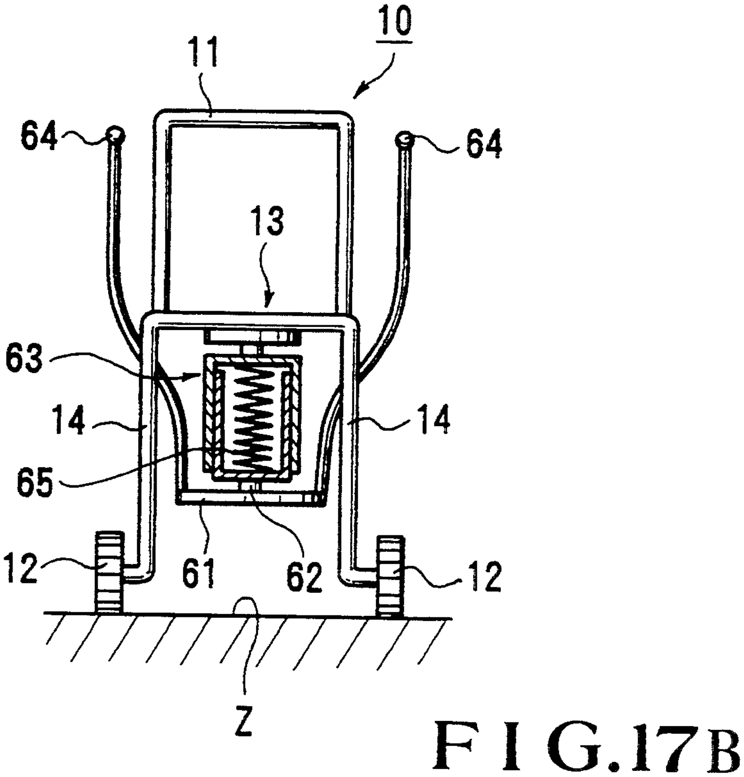

According to the movable chair 10 having the above-described arrangement, while the person M is not on the seat portion 13 of the chair main body 11, and the valve mechanism 68 is open so that the air damper is not operated, either the traveling devices 12 or the direction change disk 61 or all of them are in contact with the ground. When the person M sits on the movable chair 10 in this state, and the sticks 64 are pulled up while the valve mechanism 68 is closed to lock the air damper, as shown in FIGS. 17(*a*) and 17(*b*), the compression spring 65 inhibits the elevating mechanism 63 from extending. As a result, as shown in FIGS. 15(*a*) and 15(*b*), the direction change disk 61 is kept lifted above the traveling devices 12 at a position below the chair main body 11 by the function of the elevating mechanism 63 described above, while the chair main body 11 is supported by the traveling devices 12 in contact with the ground and is caused to travel upon traveling of the traveling devices 12.

Figure 16A:
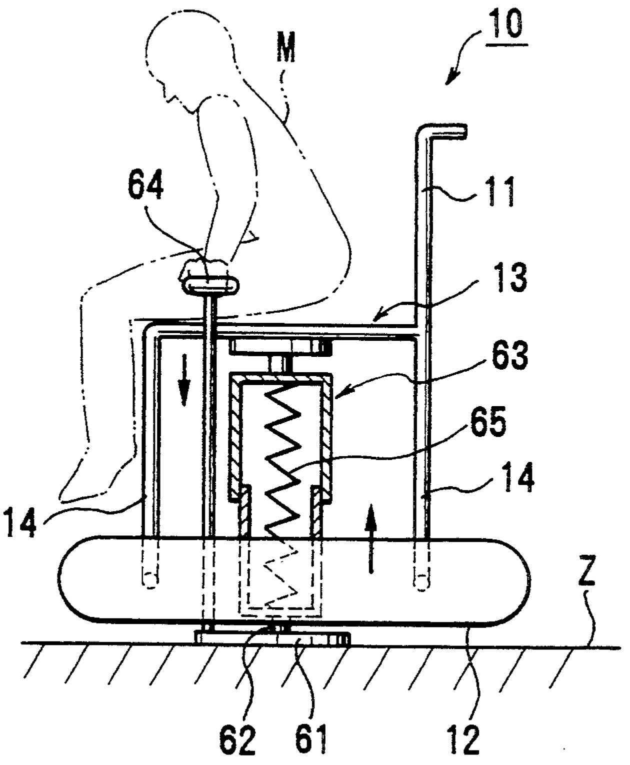
FIGS. 16(*a*) and 16(*b*) are views for explaining an operation of the direction change device according to the present invention, in which FIG. 16(*a*) is a schematic side view showing a state wherein the sitting person shifts his/her weight from the seat portion to sticks, and FIG. 16(*b*) is a schematic front view thereof.
Figure 16B:
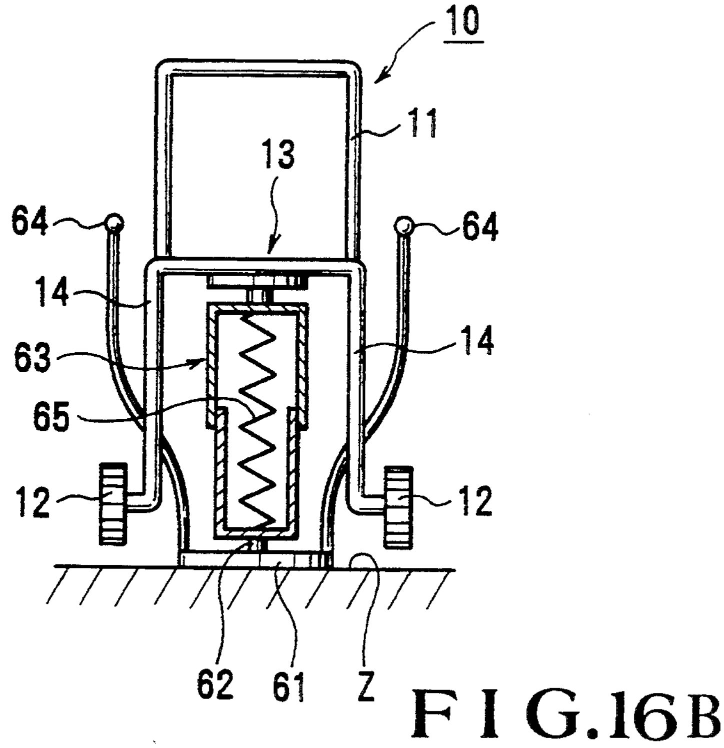

When the direction of the movable chair 10 is to be changed, as is apparent from FIG. 16(*a*), the person M on the chair main body 11 raises his/her hips and shifts his/her weight to the sticks 64 through his/her arms while opening the valve mechanism 68 to release the lock of the air damper of the elevating mechanism 63.

With this operation, the direction change disk 61 is lowered to come into contact with the ground by means of the sticks 64 to which the weight of the person M is applied. At the same time, with a decrease in weight of the person M which is applied to the seat portion 13, the biasing force of the compression spring 65 of the elevating mechanism 63 acts to cause the traveling devices 12 supporting the chair main body 11 to be lifted from the ground, in contrast to the direction change disk 61.

Figure 14:
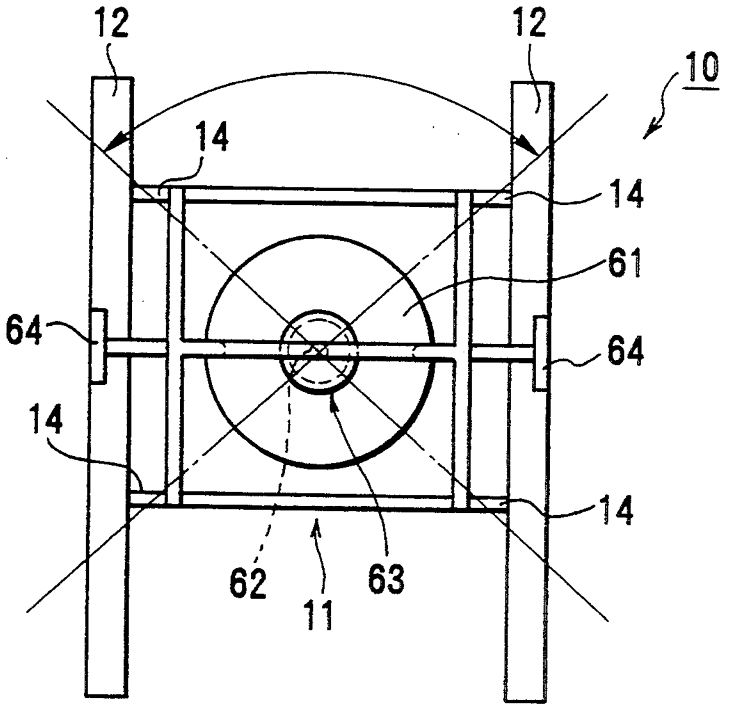
FIG. 14 is a schematic plan view of the movable chair in FIG. 5.

After the valve mechanism 68 is closed to lock the air damper to maintain this state, the person M sits on the seat portion 13 and performs a direction change operation by using the direction change device 60. The sitting person M can change the chair main body 11 and the traveling devices 12 in an arbitrary direction by rotating the chair main body 11 and the traveling devices 12 relative to the sticks 64 on the disk 61 in contact with the ground using the rotating shaft means 62, thereby changing the traveling direction of the traveling devices 12 in a desired direction. In this embodiment, the lower end portions of the sticks 64 are coupled to the disk 61, and the sticks 64 and the members of the chair main body 11 interfere with each other in the rotational direction. For this reason, the maximum direction change angle shown in FIG. 14 is set. It is apparent that this angle can be properly changed by properly changing the positional relationship between these components.

When the direction change operation described above is to be performed, air is taken into or sealed in the cylindrical members 66 and 67 as the air damper constituting the elevating mechanism 63 by properly opening the valve mechanism 68, thus selectively causing the compression spring 65 to extend and contract or inhibiting extension and contraction. For example, when the direction change operation shown in FIGS. 16(*a*) and 16(*b*) is to be performed, the compression spring 65 is temporarily caused to extend and is locked in this state to prevent it from contracting. Subsequently, as shown in FIGS. 16(*a*) and 16(*b*), the disk 61 is brought into contact with the ground, and a person sits on the seat portion 13 and shifts his/her weight to the chair main body 11 while the traveling devices 12 are lifted from the ground. When the direction of the movable chair 10 is to be changed in this state, even if some force acts on the elevating mechanism 63 to compress the spring 65, the extended state of the compression spring 65 is maintained against the force. That is, the vertical movement of the compression spring 65 between the chair main body 11 and the disk 61 can be controlled in a desired state by the irreversible operation of the valve mechanism 68 as an exhaust valve.

After the direction of the movable chair 10 is changed by performing the above-described direction change operation, the operation levers 69 are operated to open the valve mechanism 68 as the exhaust valve so as to exhaust the internal air, thus releasing the locked state of the air damper. The contraction preventing function for the spring 65 is then released, and the compression spring 65 contracts because the weight of the sitting person M is also applied thereto. As a result, the disk 61 is moved upward, and the traveling devices 12 are brought into contact with the ground, thereby allowing the movable chair 10 to travel in the changed direction.

The amount of contraction of the compression spring 65 which is obtained by only the above-described operation of the operation levers 69 may be insufficient so that the amount of upward movement of the disk 61 by means of the elevating mechanism 63 may be too small to release the disk 61 from the contact with the ground. In such a case, while the locked state of the air damper is maintained, the sitting person M forcibly lifts the sticks 64 to cause the compression spring 65 having the elevating mechanism 63 to contract. With this operation, traveling by the traveling devices 12 can be performed. It is apparent that while the spring 65 is set in a contracting state, the air damper is to be locked by closing the valve mechanism 68 to reliably inhibiting the spring 65 from extending, thereby inhibiting the disk 61 from coming into contact with the ground.

In other words, the above-described elevating mechanism 63 is controlled to perform a predetermined upward/downward moving operation depending on whether the weight of the person M is applied to the seat portion 13 or the sticks 64, or whether the air damper is set in a locked state or a lock-released state by ON/OFF control of the valve mechanism 68, or whether the sticks 64 are lifted or not.

Referring to FIGS. 15 to 17, reference symbol Z denotes a ground with which the traveling devices and the disk 61 are selectively brought into contact.

According to the above-described arrangement, the person M sitting on the chair main body 11 can selectively bring either the traveling devices 12 or the disk 61 of the direction change device (rotating device) 60 into contact with the ground by selectively applying his/her weight onto the seat portion 13 of the chair main body 11 and the sticks 64. When the disk 61 of the direction change device 60 is brought into contact with the ground, the traveling devices 12 are lifted from the ground, and their direction can be arbitrarily changed, thus allowing an arbitrary change in traveling direction. Note that the total weight of the person M need not be applied to the seat portion 13 or the sticks 64, but may be properly distributed so that the traveling devices 12 and the direction change disk 61 can be selectively brought into contact with the ground. In addition, by distributing the weight of the person M to selectively bring the traveling devices 12 and the disk 61 into contact with the ground, the movable chair 10 can be operated in a variety of manners in accordance with various traveling conditions and states, thereby improving the operability.

With the direction change device 60 having such an arrangement, the occurrence of bedsore can be suppressed. Bedsore is caused when a person keeps sitting on the movable chair 10 such as a wheelchair for a long period of time. More specifically, in order to prevent bedsore, it is required for the person M sitting on the movable chair 10 to periodically lifts his/her hip portion or thigh portion, pressed against the seat portion 13, from the seat portion 13 as with the case of a conventional movable chair. According to the movable chair 10 having the direction change device 60 requiring the above-described operations, every time a direction change operation is performed by using the device 60, the person must lift his/her hip portion and the like from the seat portion 13, thus effectively preventing bedsore. In addition, according to the direction change device 60, since the traveling devices 12 are lifted from the ground when a direction change operation is performed, outdoor and indoor covers can be selectively attached to the traveling surface portions of the traveling devices 12, thereby providing the movable chair 10 which can be easily used indoor and outdoor.

In the above-described embodiment, the sticks 64 to which the person M applies his/her weight to perform a direction change operation are bent at their lower portions and are integrally coupled to the disk 61. However, the present invention is not limited to this. The sticks 64 may be supported on proper portions of the chair main body 11 to be vertically movable while their lower ends can be directly brought into contact with the ground Z.

Figure 18:
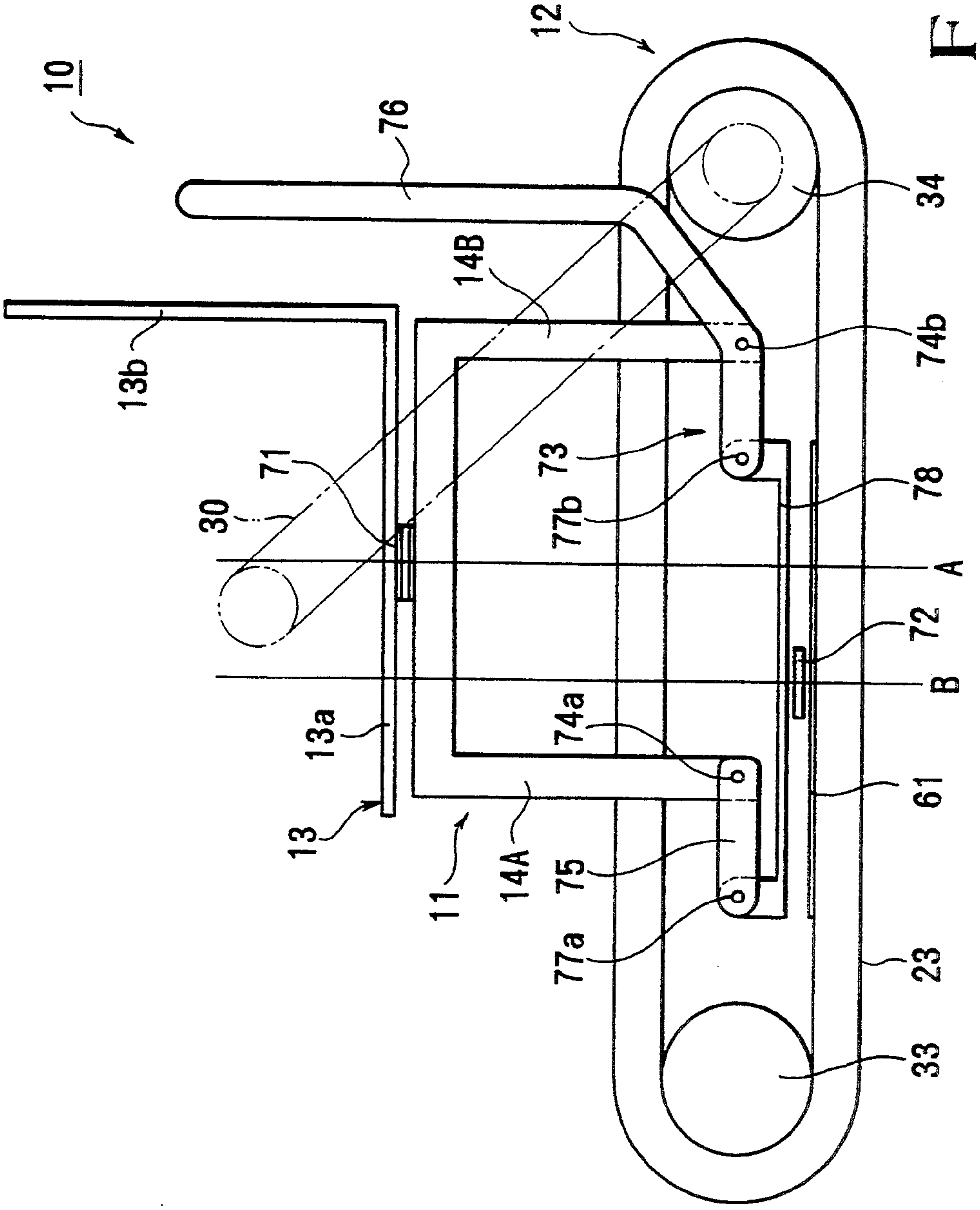
FIG. 18 is a side view showing the basic arrangement of a movable chair according to another embodiment of the present invention in a traveling state.
Figure 19:
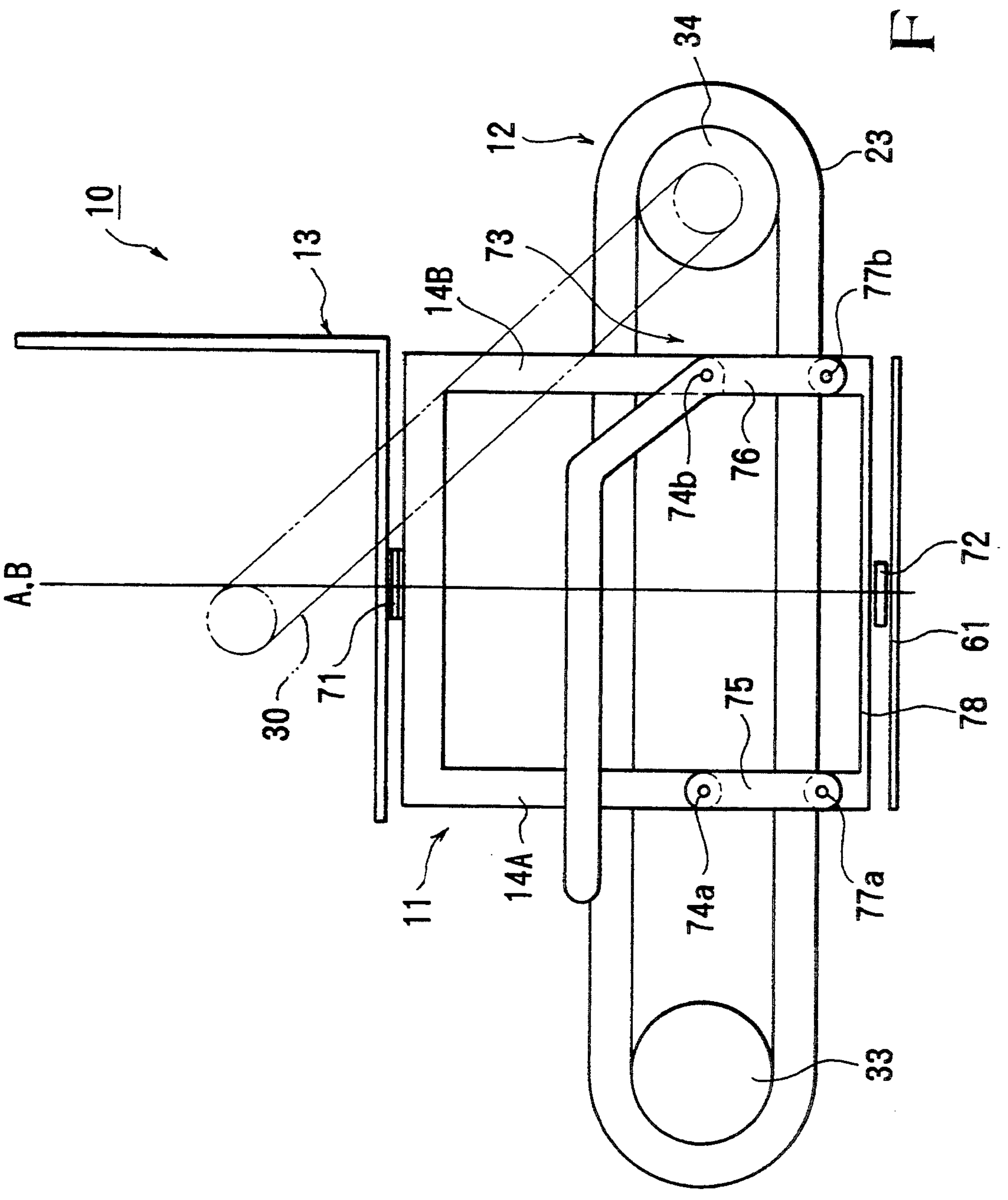
FIG. 19 is a side view showing a direction change mode.

In addition, as a modification of the direction change device 60 of the movable chair 10 in the above-described embodiment, a device having the arrangement shown in FIGS. 18 and 19 may be used. The same reference numerals in this modification denote the same parts as in the embodiment shown in FIGS. 1 to 17.

According to the movable chair 10 of the above-described embodiment, the direction change disk 61 is arranged on the chair main body 11 to be vertically movable. With this arrangement, in a direction change operation, the disk 61 is brought into contact with the ground to lift the chair main body 11 and the traveling devices 12 constituted by the crawlers from the ground so that the chair main body 11 is rotated about the rotating shaft means 62 coupling the disk 61 and the chair main body 11 to each other, thus changing the direction of the movable chair 10. In this operation, however, in order to allow the person (sitting person) sitting on the movable chair 10 to generate a force to rotate the chair main body 11, the sticks 64 and the like as reaction support points must be disposed on the disk 61 or the ground side. In addition, since the directions of the traveling devices 12 and the sitting person are simultaneously changed, some inconveniences may be caused in terms of the number of components and handling.

For this reason, in this modification, a direction change operation can be easily performed without using the sticks 64 and the like, and only the direction of the traveling devices 12 can be changed without changing the direction of a person sitting on the movable chair 10.

FIG. 18 shows the basic arrangement of the movable chair of the modification, showing its state in the traveling mode. FIG. 19 shows a state of the movable chair in the direction change mode. Referring to FIGS. 18 and 19, the modification uses crawler type endless tracks as traveling devices.

A movable chair denoted by reference numeral 10 as a whole comprises a chair main body 11, a seat portion 13 disposed on the chair main body 11, a first rotating shaft 70 for coupling the chair main body 11 and the seat portion 13 to allow them to be relatively rotatable, a pair of left and right traveling devices 12 which make contact with the ground while supporting the chair main body 11 from below and is designed to cause the chair main body 11 to travel, a direction change disk disposed below the chair main body 11 and designed to be selectively brought into contact with the ground, a second rotating shaft 72 for coupling the chair main body 11 onto the disk 61 to allow the chair main body 11 to be relatively rotated, an elevating mechanism 73 interposed between the chair main body 11 and the direction change disk 11 and designed to move the disk 61 upward or downward below the chair main body 11, driving levers 30 for causing the traveling devices 12 to travel, and the like.

The elevating mechanism 73 includes a pair of front and rear lift levers 75 and 76 rotatably coupled to the lower ends of front and rear legs 14A and 14B of the chair main body 11 through coupling pins 74*a* and 75*b*, respectively, and a support plate 78 pivotally supported between the lower ends of the lift levers 75 and 76 through coupling pins 77*a* and 77*b*. The upper end of the second rotating shaft 72 is coupled to the center of the lower surface of the support plate 78.

The upper end of the rear lift lever 76 extends forward from the front leg 14A to allow a person sitting on the seat portion 13 to easily operate the lift lever 76. The elevating mechanism 73 is designed such that when the rear lift lever 76 is pivoted vertically by the sitting person, the operation modes of the movable chair 10 are switched between the traveling mode, in which the traveling devices 12 are in contact with the ground, and the direction change mode, in which the direction change disk 61 is in contact with the ground.

In the traveling mode in which the disk 61 is lifted from the ground by pivoting the lift lever 76 backward to a substantially vertical position, the direction change disk 61 is located at a predetermined distance from the seat portion 13, and axes A and B of the first and second rotating shafts 71 and 72 are shifted from each other, as shown in FIG. 18. When the lift lever 76 is pivoted forward in a substantially horizontal position to switch the traveling mode to the direction change mode, the chair main body 11 is lifted from the ground and is moved forward to locate the direction change disk 61 immediately below the seat portion 13, thus causing the axes A and B of the first and second rotating shafts 71 and 72 to coincide with each other, as shown in FIG. 19.

A direction change operation of the movable chair 10 having the above-described arrangement will be described next.

When the traveling mode shown in FIG. 18 is switched to the direction change mode shown in FIG. 19 by pivoting the rear lift lever 76 forward through a predetermined angle to a substantially horizontal direction so as to bring the direction change disk 61 into contact with the ground, the chair main body 11 is lifted from the ground and is moved forward to locate the seat portion 13 immediately above the direction change disk 61, as described above.

Subsequently, the axes A and B of the first and second rotating shafts 71 and 72 coincide with each other to allow the chair main body 11 and the seat portion 13 to be relatively rotated.

When the sitting person manually rotates the chair main body 11 in a desired direction, the seat portion 13 is not rotated but only the chair main body 11 having a smaller mass and a smaller moment of inertia can be rotated.

That is, the total mass of the chair main body 11 and the traveling devices 12 is about 10 kg at most, which is sufficiently smaller than the total mass of the seat portion 13 and the sitting person. Therefore, only the chair main body 11 is rotated to change the direction of the traveling devices 12 without changing the direction of the sitting person.

Figure 20:
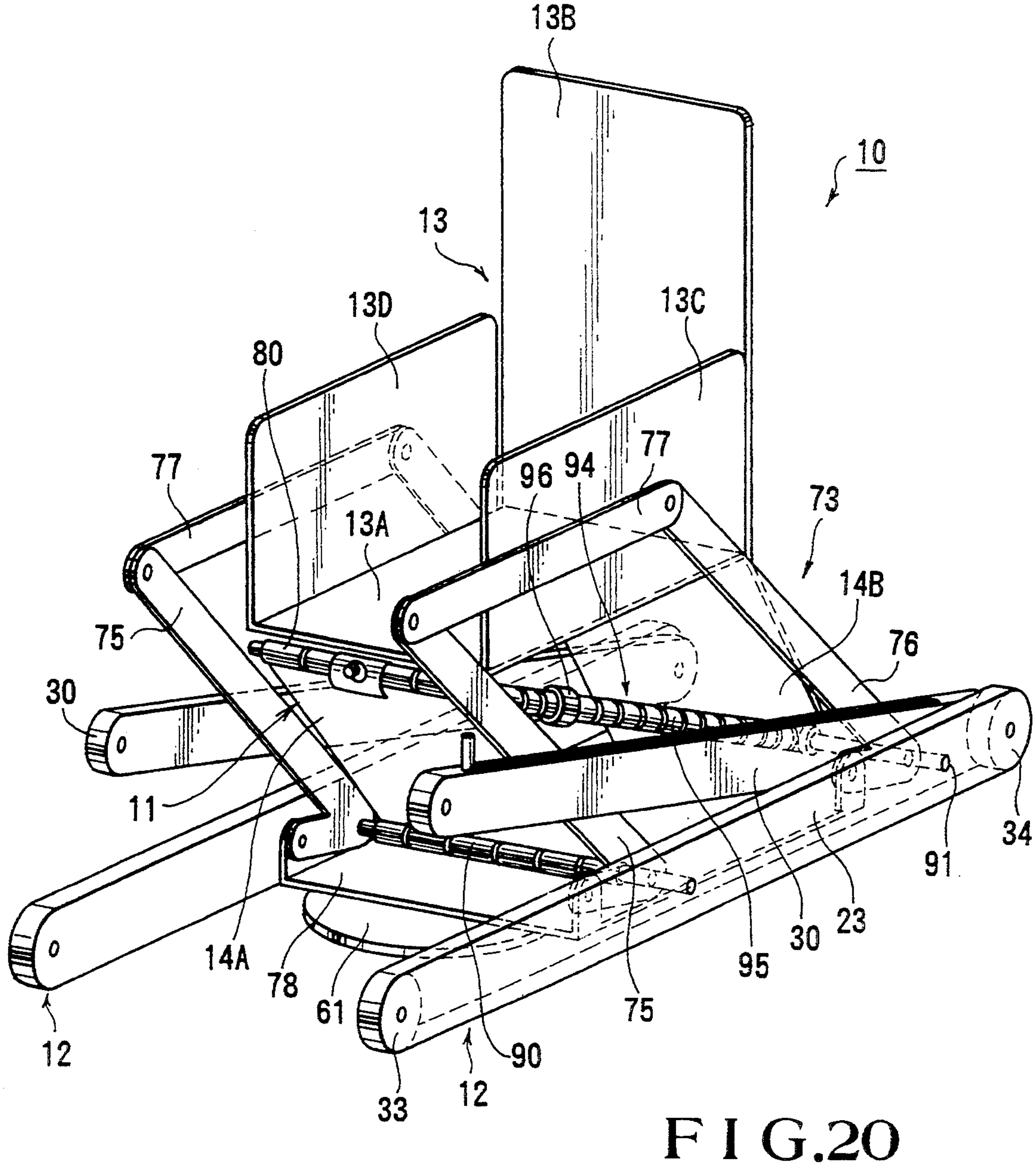
FIG. 20 is a perspective view showing the outer appearance of a detailed embodiment based on the basic arrangement.
Figure 21:
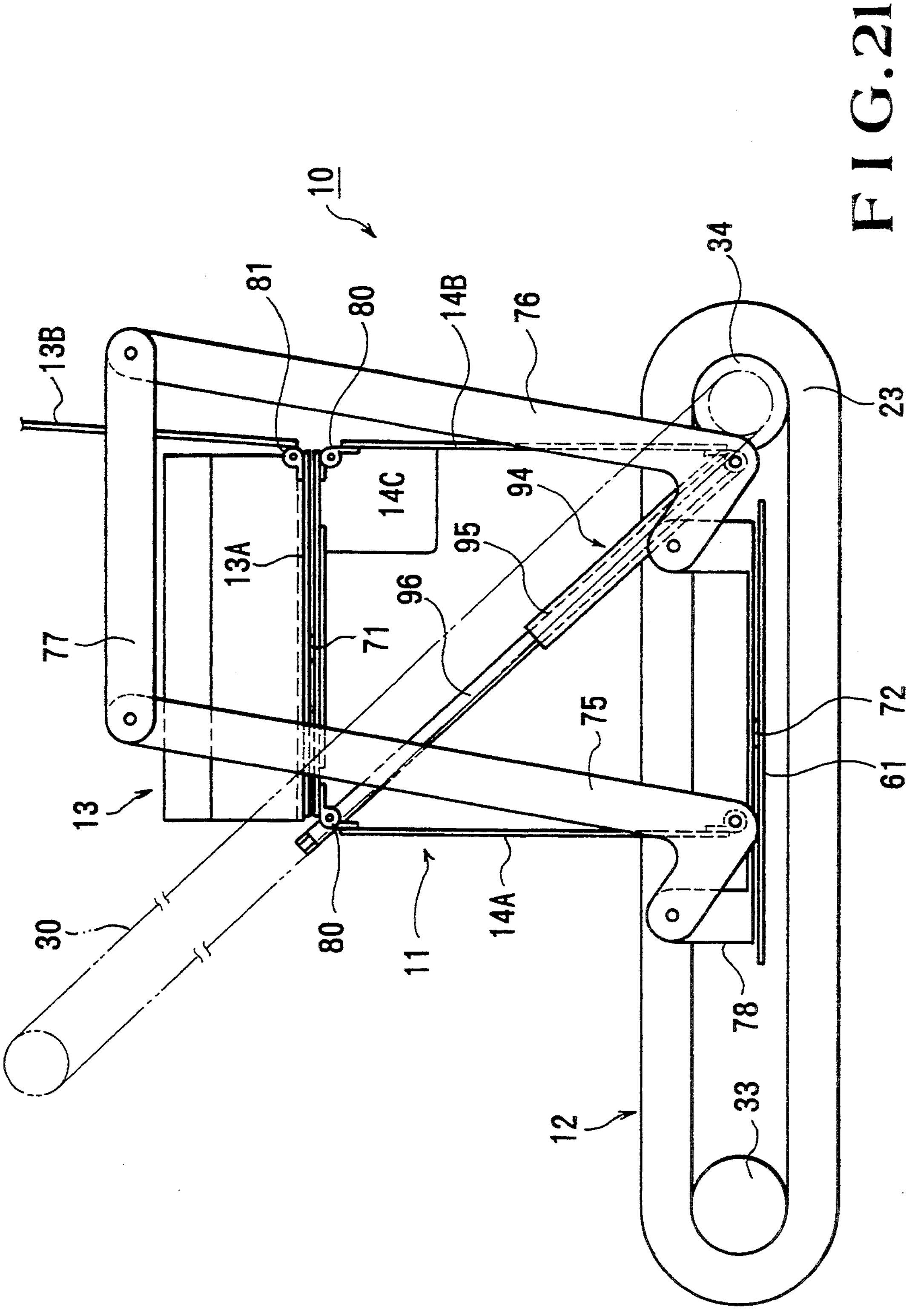
FIG. 21 is a side view showing a traveling mode.
Figure 22:
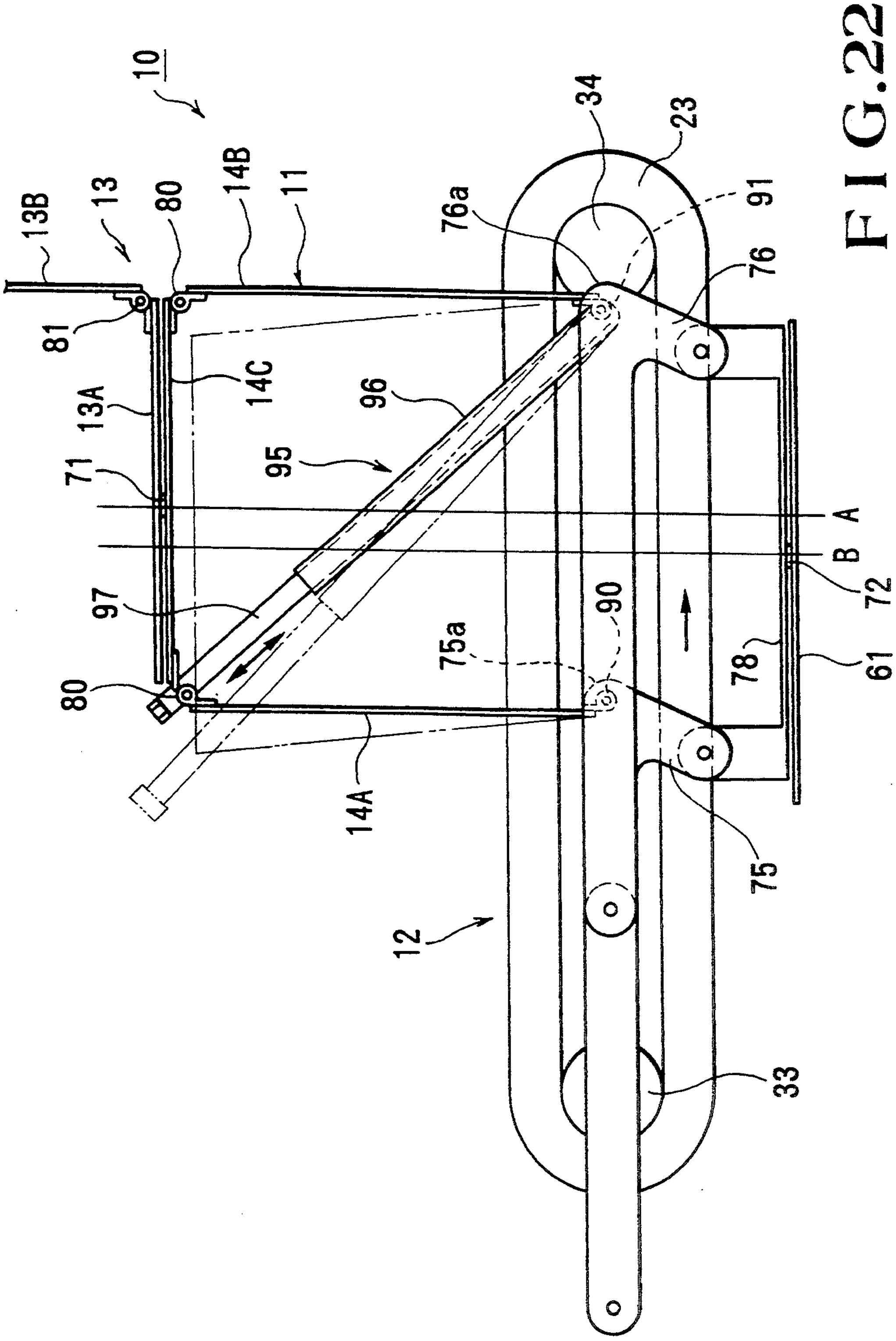
FIG. 22 is a side view showing a state in the direction change mode.

FIGS. 20 to 22 show a detailed embodiment of the direction change device 60 shown in FIGS. 18 and 19. FIG. 20 shows the outer appearance of the detailed embodiment of the present invention. FIG. 21 shows a state of the embodiment in the traveling mode. FIG. 22 shows a state of the embodiment in the direction change mode. Note that the same reference numerals in FIGS. 20 to 22 denote the same parts as in FIGS. 18 and 19.

Referring to FIGS. 20 to 22, a movable chair 10 includes a chair main body 11 constituted by plate-like front and rear legs 14A and 14B and a ceiling plate 14C. The upper ends of the front and rear legs 14A and 14B pivotally supported on the front and rear ends of the ceiling plate 14C through hinges 80, respectively, so as to be foldable. A seat portion 13 includes a seat 13A, a back plate 13B, and a pair of left and right side plates 13C and 13D. The lower end of the back plate 13B is coupled to the rear end of the seat 13A through a hinge 81 so as to be foldable.

Pipes 90 and 91 are respectively fixed to the lower ends of the front and rear legs 14A and 14B of the chair main body 11. Left and right traveling devices 12 and lower end bent portions 75*a* and 76*a* of mode switching lift levers 75 and 76 constituting an elevating mechanism 73 are mounted on these pipes 90 and 91. In addition, the upper ends of the lift levers 75 and 76 are coupled to each other through a link lever 77.

A support plate 78 is coupled between the lower ends of the lift levers 75 and 76 to be relatively movable. When the lift levers 75 and 76 are tilted forward, the direction change disk 61 is brought into contact with the ground, and the traveling mode is switched to the direction change mode, as shown in FIG. 22. In contrast to this, if the levers 75 and 76 are pulled upward and erected, as shown in FIG. 21, the direction change disk 61 is moved upward, while the traveling devices 12 are brought into contact with the ground, thus switching the direction change mode to the traveling mode.

A seat moving means 94 is disposed in the chair main body 11 to move the seat portion 13 forward/backward. The seat moving means 94 is constituted by a pipe incorporating a plurality of balls, and a screw rod 96 threadably engaged with the pipe 95. The lower end of the pipe 95 is rotatably coupled to the lower end of the rear leg 14B. The upper end of the screw rod 96 is rotatably coupled to a coupling portion between the front leg 14A and the seat 13A.

When the rod screw 96 is rotated and moved forward with respect to the pipe 95, the front leg 14A is tilted forward to move the seat portion 13 forward, as indicated by the alternate long and two short dashed lines in FIG. 22. With this operation, axes A and B of first and second rotating shafts 71 and 72 coincide with each other. In contrast to this, if the screw rod 96 is moved backward, the front leg 14A is set in a substantially vertical position, and the seat portion 13 is moved backward. As a result, the axes A and B of the first and second rotating shafts 71 and 72 shift from each other.

In such an arrangement, similar to the above-described embodiment, the directions of the chair main body 11 and the traveling devices 12 can be changed without rotating the seat portion 13.

As has been described above, the movable chair of the present invention comprises a chair main body having a seat portion, a pair of left and right traveling devices which make contact with the ground while supporting the chair main body and is designed to cause the chair main body to travel, and a direction change device for changing the moving direction of the traveling devices. The chair main body has front and rear leg portions whose lower ends are respectively supported on the left and right traveling devices. The left and right traveling devices are constituted by traveling frames elongated in the traveling direction, and endless tracks to be moved along the circumferential portions of the traveling frames. The direction change device is mounted on either the chair main body or the traveling devices and is designed to selectively bring the direction change device into contact with the ground to lift the chair main body and the traveling devices from the ground, thus allowing a direction change operation. Therefore, there is provided a movable chair including a chair main body having a simple structure, traveling devices capable of traveling without being influenced by traveling environment and conditions, and minimizing the adverse effects on a sitting person, and a direction change device capable of performing a direction change operation in any narrow space.

In addition, according of the present invention, the movable chair comprises front and rear crank shafts constituting two pairs of front and rear leg portions having lower end portions supported, as rotatable axial support portions, on the left and right traveling devices, coupling frames interposed between the horizontal portions of the front and rear shafts to constitute the seat portion and having two end portions rotatably coupled to the respective shafts, a coupling lever interposed between the leg portion, located on one shaft side, and the coupling frame to be extendible, capable of adjusting its extendible amount, and integrally coupling the two members at each adjusting position, and a biasing means constituted by a tension spring or the like interposed between the horizontal portion of the front shaft and the lower end of the leg portion of the rear shaft and designed to provide a biasing force to keep each leg portion in a substantially vertical position in a normal operation period during which a person is sitting on the chair. Therefore, the following advantages can be obtained in spite of the simple, inexpensive arrangement of the present invention.

(1) Since the overall chair can be folded such that the sitting portion is lowered to a position near the ground, a person physically handicapped by his/her legs or the like can safely and easily mount on the seat by his/her own strength. In addition, the sitting seat position of the chair can be shifted to the normal height with a small force by using the energy accumulated in the biasing means such as springs.

(2) The seat position of the chair can be quickly lowered with a small force by utilizing the potential energy and the position of the center of gravity of a person sitting on the chair.

(3) In various conditions accompanying daily activities using the movable chair, when the position of the center of gravity of a sitting person needs to be shifted forward/backward from the seat, the relative positions of the leg portions and the seat portion are changed by his/her own strength to maintain the overall balance, thereby preventing the chair from falling.

(4) The overall structure of the movable chair can be simplified, and hence a reduction in size and weight of the chair can be achieved to allow easy movement and transfer of the chair, thus increasing the degree of freedom in daily activities of a person physically handicapped by his/her legs or the like.

(5) Since the seat portion need not be folded when the chair is to be folded, unlike the conventional wheelchair, the function of a seat member to be mounted on the seat portion can be arbitrarily selected, thereby providing a seat capable of satisfying medical requirements and ensuring a feeling of comfort.

Furthermore, the traveling devices of the movable chair according of the present invention comprises a pair of left and right traveling frames, each elongated along the traveling direction, having an endless rail portion continuously constituted by upper and lower edge portions and two actuated end portions, and designed to support the chair main body, and a plurality of ground-contact feet to be moved along the endless rail portion formed on the circumferential portion of each traveling frame. In addition, at least two of these ground-contact feet are always located at the lower edge portion of each traveling frame to be brought into contact with the ground. Therefore, in spite of the simple arrangement, the chair main body can be caused to travel in a desired direction under desired conditions through the traveling frames by moving the movable ground-contact feet along the endless rail portions formed on the circumferential portions of the traveling frames. In comparison with the conventional structure, the structure of the present invention can minimize vertical motions produced when the movable chair travels on an uneven road. In addition, various advantageous effects can be obtained, e.g., a reduction in size of the overall apparatus and simplification of the arrangement.

According to the present invention, the plurality of ground-contact feet are constituted by at least two types of ground-contact feet, i.e., high and low ground-contact feet having different heights from their contact points with respect to the endless rail portion of each traveling frame to the ground-contact points. In addition, the plurality of ground-contact feet are disposed at predetermined intervals on the endless rail portion of each traveling frame while they are coupled to each other through an endless belt. With this structure, the influences of low obstacles and the like, of obstacles, recesses, and projections on the track, can be avoided owing to the height of the high feet, thereby allowing smooth traveling with the minimum necessary force while reducing vertical motions. In addition, a stable, sufficient driving state can be ensured.

The movable chair according to the present invention comprises a direction change disk supporting the chair main body from below, disposed at a position different from that of each traveling device to be vertically movable, and designed to be selectively brought into contact with the ground, a rotating shaft means for coupling the chair main body to the disk to allow the chair main body to be rotatable relative to the disk, an elevating mechanism disposed between the chair main body and the disk and designed to vertically move the disk below the chair main body, and sticks for supporting the weight of a person sitting on the seat portion of the chair main body above the ground. Therefore, in spite of the simple arrangement, a person sitting on the chair main body can selectively bring either the traveling devices or the disk of the direction change device into contact with the ground by properly shifting his/her weight to the seat portion or the sticks. When the disk of the direction change device is brought into contact with the ground, the traveling devices are lifted from the ground to allow the person to arbitrarily change the direction of the traveling devices, thereby allowing an arbitrary change in traveling direction.

According to such a direction change device, every time a direction change operation is performed by using the device, the person lifts his/her hip portion and the like from the seat, thus effectively preventing bedsore caused when the person keeps sitting on a movable chair such as a wheelchair for a long period of time.

In addition, according to such a direction change device, since the traveling devices are lifted from the ground when a direction change operation is performed, outdoor and indoor covers can be selectively attached to the travel surface portions of the traveling devices, thereby providing a movable chair which can be easily used indoors and outdoors.

Furthermore, according to the movable chair of the present invention, the seat portion is mounted on the chair main body to be relatively movable, and a direction change disk is disposed below the chair main body to be relatively movable. In addition, the traveling mode and the direction change mode are selectively switched by an elevating mechanism. In the direction change mode, the axis of the rotating shaft on the seat portion side coincides with the axis of the rotating shaft on the disk side. Therefore, when the chair main body is manually rotated without using sticks and the like, the seat portion is not rotated because of the difference in mass between the chair main body and the seat portion, but only the chair main body can be rotated and hence its direction can be changed.

Moreover, according to the present invention, since the direction change disk is mounted on the movable chair, the direction of the chair can be easily changed even on gravel, sandy, and snowy paths.

What is claimed is:

1. A movable chair comprising:
- a chair main body having a seat portion; and
- a pair of left and right traveling devices, disposed on the left and right sides of said chair main body, for moving said chair main body while supporting said chair main body,
- said traveling devices including
  - traveling frames disposed along a traveling direction,
  - endless rail portions respectively disposed around said traveling frames,
  - endless tracks respectively wound around said endless rail portions,
  - driving means for driving said endless tracks, and
  - means for allowing a sitting person to control said driving means, and
  - said endless tracks including,
    - endless driving belts, and
    - a plurality of ground contact feet mounted on said endless driving belts at a predetermined interval, said ground-contact feet being of two types, said two types being one of a plurality of low ground-contact feet and a plurality of a high ground-contact feet, each of said low ground contact feet being shorter than said high ground contact feet.

2. A chair according to claim 1, said plurality of ground-contact feet are disposed such that at least two feet are always located on a lower edge portion of said endless rail portion of each of said traveling frames so as to be in contact with the ground.

3. A chair according to claim 1, wherein each of said high ground contact feet comprises:
- a foot main body having at least one pivot pin for attaching said foot main body to said endless driving belts, and,
- a plurality of rollers axially supporting the foot main body, allowing the foot main body to travel along said endless rail portions,
- each of said plurality of rollers having a corresponding axial support pin for attaching said roller to said foot main body,
- an engaging groove that engages a traveling frame portion of said endless rail portions.

4. A chair according to claim 1, wherein each of said low ground contact feet comprises:
- a foot main body having at least one pivot pin for attaching said foot main body to said endless driving belts, and,
- a plurality of rollers axially supporting the foot main body, allowing the foot main body to travel along said endless rail portions,
- each of said plurality of rollers having a corresponding axial support pin for attaching said roller to said foot main body,
- an engaging groove that engages a traveling frame portion of said endless rail portions.

5. A movable chair comprising:
- a chair main body having a seat portion; and
- a pair of left and right traveling devices, disposed on the left and right sides of said chair main body, for moving said chair main body while supporting said chair main body,
- said traveling devices including
  - traveling frames disposed along a traveling direction,
  - endless rail portions respectively disposed around said traveling frames,
  - endless tracks respectively wound around said endless rail portions,
  - driving means for driving said endless tracks, and
  - means for allowing a sitting person to control said driving means, and
  - said endless tracks including,
    - endless driving belts, and
    - a plurality of ground contact feet mounted on said endless driving belts and having different shapes,
- a direction change device wherein said direction change device has a direction change disk disposed below said main chair body to be vertically movable and rotatable and designed to be selectively brought into contact with the ground.

6. A chair according to claim 5, further comprising rotating shaft means, disposed between said chair main body and said direction change disk, for coupling said chair main body onto said disk to allow said disk and said chair main body to be relatively rotated, and
- an elevating mechanism, interposed between said chair main body and said direction change disk, for vertically moving said disk below said chair main body.

7. A chair according to claim 6, wherein said elevating mechanism comprises means for, when a weight of the person sitting on said seat portion of said elevating mechanism is shifted to said sticks through arms of the person, lowering and causing said direction change disk to come into contact with the ground, and setting a distance from said disk to said seat portion of said chair main body to be longer than a distance from a ground-contact surface of each of said traveling devices to said seat portion, thereby lifting said chair main body and said traveling devices from the ground, and while said chair main body and said traveling devices are lifted from the ground, a direction change operation can be performed in a desired direction by said rotating shaft means.

8. A chair according to claim 7, wherein said elevating mechanism comprises a compression spring as spring means for causing said direction change disk to come into contact with the ground and biasing said disk in a direction to separate from said chair main body so as to lift said chair main body and said traveling devices from the ground.

9. A chair according to claim 8, wherein said compression spring has a maximum pressing force smaller than a sum of weights of the person sitting on said chair main body, said chair main body, and said traveling devices, and has a biasing force larger than a sum of weights of said chair main body and said traveling devices, the distance from a ground-contact surface of said disk to said chair main body becomes longer than the distance from the ground-contact surface of each of said traveling devices to said chair main body when said compression spring extends most, and the distance from the ground-contact surface of said disk to said chair main body becomes shorter than the distance from the ground-contact surface of each of said traveling devices to said chair main body when said compression spring contracts most.

10. A chair according to claim 8, wherein said compression spring constituting said elevating mechanism comprises a pair of extendible cylindrical members for forming a sealed space serving as an air damper mechanism, and a valve mechanism controlled by a lever operation to be caused to communicate with the outside and to be shut off from the outside.

11. A chair according to claim 10, wherein said valve mechanism is designed to be opened/closed by an operation lever disposed near said stick.

12. A movable chair comprising:

a pair of left and right traveling devices, disposed on the left and right sides of the chair main body, for moving said chair while supporting said chair main body, said traveling devices including traveling frames disposed along the traveling direction, endless rail portions respectively disposed around said traveling frames, endless tracks respectively wound around said endless rail portions, driving means for driving said endless tracks, means for allowing a sitting person to control said driving means, and said endless tracks including, endless driving belts, and a plurality of ground contact feet mounted on said endless driving belts and having different shapes;

a direction change device, disposed below said main chair body, for changing the traveling direction of said traveling devices;

a chair main body having a seat portion; and a first rotating shaft, disposed as a separate member on an upper portion of said chair main body, for coupling said chair main body and said seat portion to each other to allow said chair main body and said seat portion to be relatively rotated, a second rotating shaft, disposed below said chair main body to be vertically movable and selectively brought into contact with the ground, for coupling said chair main body onto said direction change disk to allow said chair main body to be relatively rotated, and an elevating mechanism, disposed between said chair main body and said direction change disk, for vertically moving said disk below said chair main body to selectively switch a traveling mode in which said traveling devices supporting said chair main body is brought into contact with the ground and a direction change mode in which said direction change disk is brought into contact with the ground, said elevating mechanism being designed to shift axes of said first and second rotating shafts from each other in the traveling mode, and cause the axes to coincide with each other in the direction change mode.

13. A chair according to claim 12, wherein said means for switching said elevating mechanism to the traveling mode or the direction change mode comprises lift levers pivotally supported on lower ends of front and rear leg portions, located below said chair main body, and on a support plate, disposed on said second rotating shaft.

14. A chair according to claim 12, further comprising lock means, disposed between said chair main body and said traveling devices, for locking said elevating mechanism in the traveling mode.

15. A movable chair comprising:

a pair of left and right traveling devices, disposed on the left and right sides of said chair main body, for moving said chair while supporting said chair main body, said traveling devices including traveling frames disposed along the traveling direction, endless rail portions respectively disposed around said traveling frames, endless tracks respectively wound around said endless tracks, driving means for driving said endless tracks, and means for allowing a sitting person to control said driving means, and said endless tracks including, endless driving belts, a plurality of ground contact feet mounted on said endless driving belts and having different shapes; and a chair main body having a seat portion wherein said chair main body has front and rear leg portions having lower end portions axially supported on said left and right traveling devices and having upper end portions axially supported on said seat portion to be pivotal, and coupling means capable of adjusting an extendible amount and biasing means for applying a biasing force to maintain said front and rear leg portions in a substantially vertical posture are disposed between a coupling shaft, disposed between said front and rear leg portions, and a vertical portion of one of said leg portions.

16. A chair according to claim 15, wherein said biasing means for maintaining said front and rear leg portions in a substantially vertical posture to maintain said seat portion of said chair main body in a normal sitting posture are constituted by tension springs, said tension springs being designed to have the biasing force to hold said front and rear leg portions in a vertical posture against a weight of a person sitting on said seat portion.

* * * * *